US011738348B2

(12) United States Patent
Sunaga et al.

(10) Patent No.: US 11,738,348 B2
(45) Date of Patent: Aug. 29, 2023

(54) FLUID HANDLING DEVICE

(71) Applicant: Enplas Corporation, Saitama (JP)

(72) Inventors: Nobuya Sunaga, Saitama (JP); Takumi Yamauchi, Saitama (JP)

(73) Assignee: Enplas Corporation, Saitama (JP)

( * ) Notice: Subject to any disclaimer, the term of this patent is extended or adjusted under 35 U.S.C. 154(b) by 354 days.

(21) Appl. No.: 16/971,407

(22) PCT Filed: Feb. 18, 2019

(86) PCT No.: PCT/JP2019/005733
§ 371 (c)(1),
(2) Date: Aug. 20, 2020

(87) PCT Pub. No.: WO2019/163687
PCT Pub. Date: Aug. 29, 2019

(65) Prior Publication Data
US 2021/0086185 A1 Mar. 25, 2021

(30) Foreign Application Priority Data
Feb. 22, 2018 (JP) .................. 2018-029833

(51) Int. Cl.
*B01L 3/00* (2006.01)
(52) U.S. Cl.
CPC ......... *B01L 3/567* (2013.01); *B01L 2300/088* (2013.01); *B01L 2300/0816* (2013.01);
(Continued)
(58) Field of Classification Search
CPC ............. B01L 3/567; B01L 2300/0816; B01L 2300/0867; B01L 2300/088;
(Continued)

(56) References Cited

U.S. PATENT DOCUMENTS

2013/0086998 A1* 4/2013 Lee ................... B01L 3/502753
73/863.24
2013/0345096 A1* 12/2013 Wan ....................... G01N 33/50
506/37

(Continued)

FOREIGN PATENT DOCUMENTS

JP    2007-085537 A    4/2007
JP    2010-025776 A    2/2010
(Continued)

OTHER PUBLICATIONS

International Search Report from International Application No. PCT/JP2019/005733, dated May 21, 2019.

*Primary Examiner* — Dennis White
*Assistant Examiner* — Peter Valentin Diaz
(74) *Attorney, Agent, or Firm* — Shih IP Law Group, PLLC

(57) ABSTRACT

A first fluid handling device according to the present invention has: a first liquid introduction part; a first cleaning liquid introduction part; a first flow path through which a liquid introduced to the first liquid introduction part or to the first cleaning liquid introduction part flows; a second liquid introduction part; a second cleaning liquid introduction part; a second flow path through which a liquid introduced to the second liquid introduction part or to the second cleaning liquid introduction part flows; a third flow path which allows flowing therethrough of the liquid having flowed through the first flow path and the liquid having flowed through the second flow path; a first diaphragm valve that is disposed between the first and third flow paths; a second diaphragm valve that is disposed between the second and third flow paths; and a chamber that is connected to the third flow path.

2 Claims, 12 Drawing Sheets

(52) U.S. Cl.
CPC ............. *B01L 2300/0867* (2013.01); *B01L 2400/0638* (2013.01)

(58) Field of Classification Search
CPC ..... B01L 2400/0638; B01L 2400/0655; B01L 3/502738; G01N 35/08; G01N 37/00
See application file for complete search history.

(56) References Cited

U.S. PATENT DOCUMENTS

| | | |
|---|---|---|
| 2014/0295533 A1 | 10/2014 | Faghri |
| 2015/0300985 A1* | 10/2015 | Ono ................... F16K 99/0015 204/601 |
| 2017/0252740 A1 | 9/2017 | Okada |

FOREIGN PATENT DOCUMENTS

| | | | |
|---|---|---|---|
| JP | 2011-137676 A | | 7/2011 |
| JP | 2011137676 A | * | 7/2011 |
| JP | 2016-208876 A | | 12/2016 |
| WO | 2008-047525 A1 | | 4/2008 |

\* cited by examiner

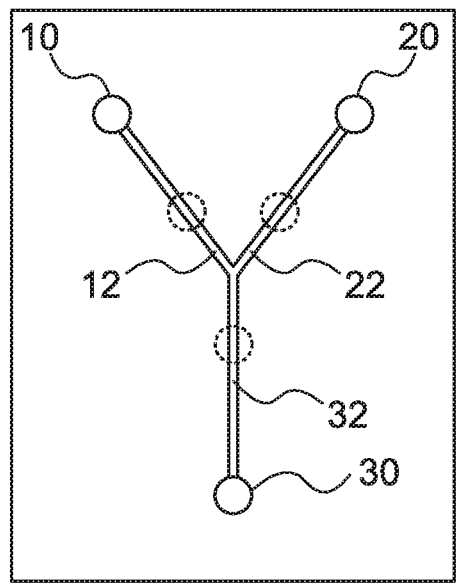
FIG. 1A
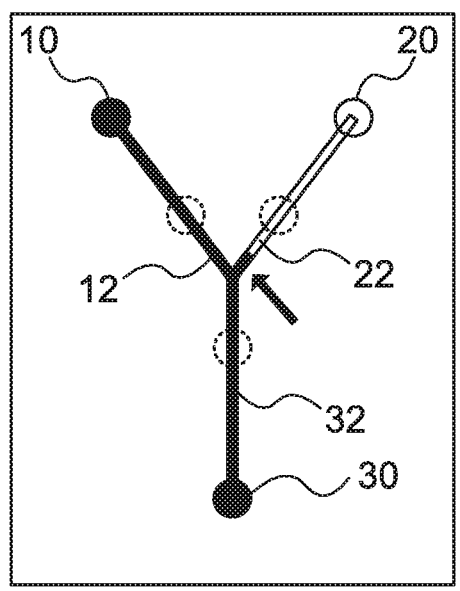
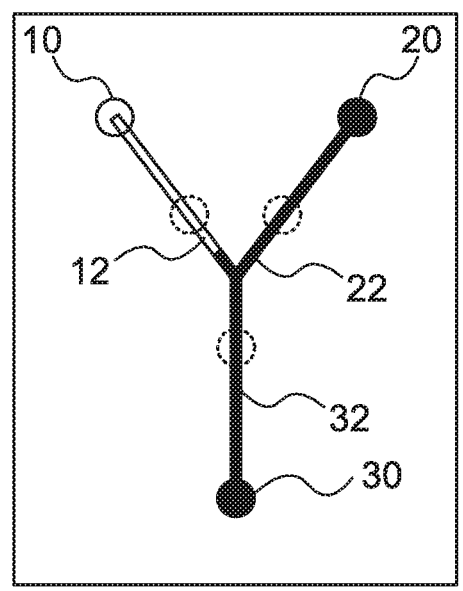
FIG. 1B
FIG. 1C

FLUID HANDLING DEVICE

TECHNICAL FIELD

The present invention relates to a fluid handling device for mixing two or more types of liquid in a chamber.

BACKGROUND ART

In recent years, fluid handling devices have been used to analyze trace amounts of substances such as proteins and nucleic acids with high precision and speed. Since fluid handling devices have the advantage of reducing the amount of reagents and samples required for analysis, they are expected to be used in various applications such as clinical tests, food tests and environmental tests. A fluid handling device that includes a plurality of channels and a plurality of micro valves, and can sequentially feed different types of liquid through sequential driving of the micro valves is known (see, for example, PTL 1).

FIG. 1 is a schematic view illustrating a configuration of a fluid handling device (channel chip) disclosed in PTL 1. As illustrated in FIG. 1, the fluid handling device (channel chip) disclosed in PTL 1 includes first liquid introduction part 10, first channel 12, second liquid introduction part 20, second channel 22, third channel 32, and liquid outlet part 30. The upstream end of first channel 12 is connected to first liquid introduction part 10, and the downstream end of first channel 12 is connected to the upstream end of third channel 32. The upstream end of second channel 22 is connected to second liquid introduction part 20, and the downstream end of second channel 22 is connected to the upstream end of third channel 32. The upstream end of third channel 32 is connected to the downstream end of first channel 12 and the downstream end of second channel 22, and the downstream end of third channel 32 is connected to liquid outlet part 30. Each of first channel 12, second channel 22 and third channel 32 are provided with a micro valve (indicated with the broken line in the drawing). For example, when the micro valves of first channel 12 and third channel 32 are opened in the state where the first liquid is introduced in first liquid introduction part 10, the liquid reaches outlet part 30 through first liquid first channel 12 and third channel 32 as illustrated in FIG. 1B. Next, when the micro valves of second channel 22 and third channel 32 are opened in the state where the second liquid is introduced in second liquid introduction part 20, the liquid reaches outlet part 30 through second liquid second channel 22 and third channel 32 as illustrated in FIG. 1C. In this manner, by opening and closing the plurality of micro valves, the first liquid and the second liquid can be sequentially fed to liquid outlet part 30.

CITATION LIST

Patent Literature

PTL 1
Japanese Patent Application Laid-Open No. 2007-85537

SUMMARY OF INVENTION

Technical Problem

In the fluid handling device disclosed in PTL 1, however, the first liquid and the second liquid may make contact with each other in the fluid handling device when the first liquid and the second liquid are sequentially fed as described above. Specifically, when the first liquid is moved from first liquid introduction part 10 to liquid outlet part 30, the first liquid flows through first channel 12 and third channel 32 and a very small part of the first liquid enters second channel 22 as indicated with the arrow in FIG. 1B. Thereafter, when the second liquid is moved from second liquid introduction part 20 to liquid outlet part 30, the second liquid makes contact with the first liquid remaining in second channel 22. Such a contact between the first liquid and the second liquid at an unintended location is not preferable depending on the application of the fluid handling device.

An object of the present invention is to provide a fluid handling device configured to bring the first liquid and the second liquid into contact with each other and can prevent contact between the first liquid and the second liquid before reaching the chamber.

Solution to Problem

A first fluid handling device of an embodiment of the present invention includes a first liquid introduction part configured to introduce first liquid; a first washing liquid introduction part configured to introduce washing liquid; a first channel configured to carry liquid introduced to the first liquid introduction part and liquid introduced to the first washing liquid introduction part; a second liquid introduction part configured to introduce second liquid; a second washing liquid introduction part configured to introduce washing liquid; a second channel configured to carry liquid introduced to the second liquid introduction part and liquid introduced to the second washing liquid introduction part; a third channel configured to carry liquid flowed through the first channel and liquid flowed through the second channel; a first diaphragm valve disposed between the first channel and the third channel; a second diaphragm valve disposed between the second channel and the third channel; and a chamber connected to the third channel.

A second fluid handling device of an embodiment of the present invention includes a first liquid introduction part configured to introduce first liquid; a second liquid introduction part configured to introduce second liquid; a washing liquid introduction part configured to introduce washing liquid; a first channel configured to carry liquid introduced to the first liquid introduction part and liquid introduced to the washing liquid introduction part; a second channel configured to carry liquid introduced to the second liquid introduction part and liquid introduced to the washing liquid introduction part; a first diaphragm valve disposed between the washing liquid introduction part, and the first channel and the second channel; a third channel connected to the first channel and the second channel and configured to carry liquid flowed through the first channel and liquid flowed through the second channel; and a chamber connected to the third channel.

A third fluid handling device of an embodiment of the present invention includes a first liquid introduction part configured to introduce first liquid; a first washing liquid introduction part configured to introduce washing liquid; a first channel configured to carry liquid introduced to the first liquid introduction part and liquid introduced to the first washing liquid introduction part; a second liquid introduction part configured to introduce second liquid; a second washing liquid introduction part configured to introduce washing liquid; a second channel configured to carry liquid introduced to the second liquid introduction part and liquid introduced to the second washing liquid introduction part;

and a chamber separately connected to each of the first channel and the second channel.

Advantageous Effects of Invention

According to the present invention, it is possible to bring the first liquid and the second liquid into contact with each other at an appropriate timing while preventing the contact between the first liquid and the second liquid before reaching the chamber.

BRIEF DESCRIPTION OF DRAWINGS

FIGS. 1A to 1C are schematic views of a fluid handling device disclosed in PTL 1.

DESCRIPTION OF EMBODIMENTS

Embodiments of the present invention are elaborated below with reference to the accompanying drawings.

Embodiment 1

Configuration of Fluid Handling Device

Figure 2:
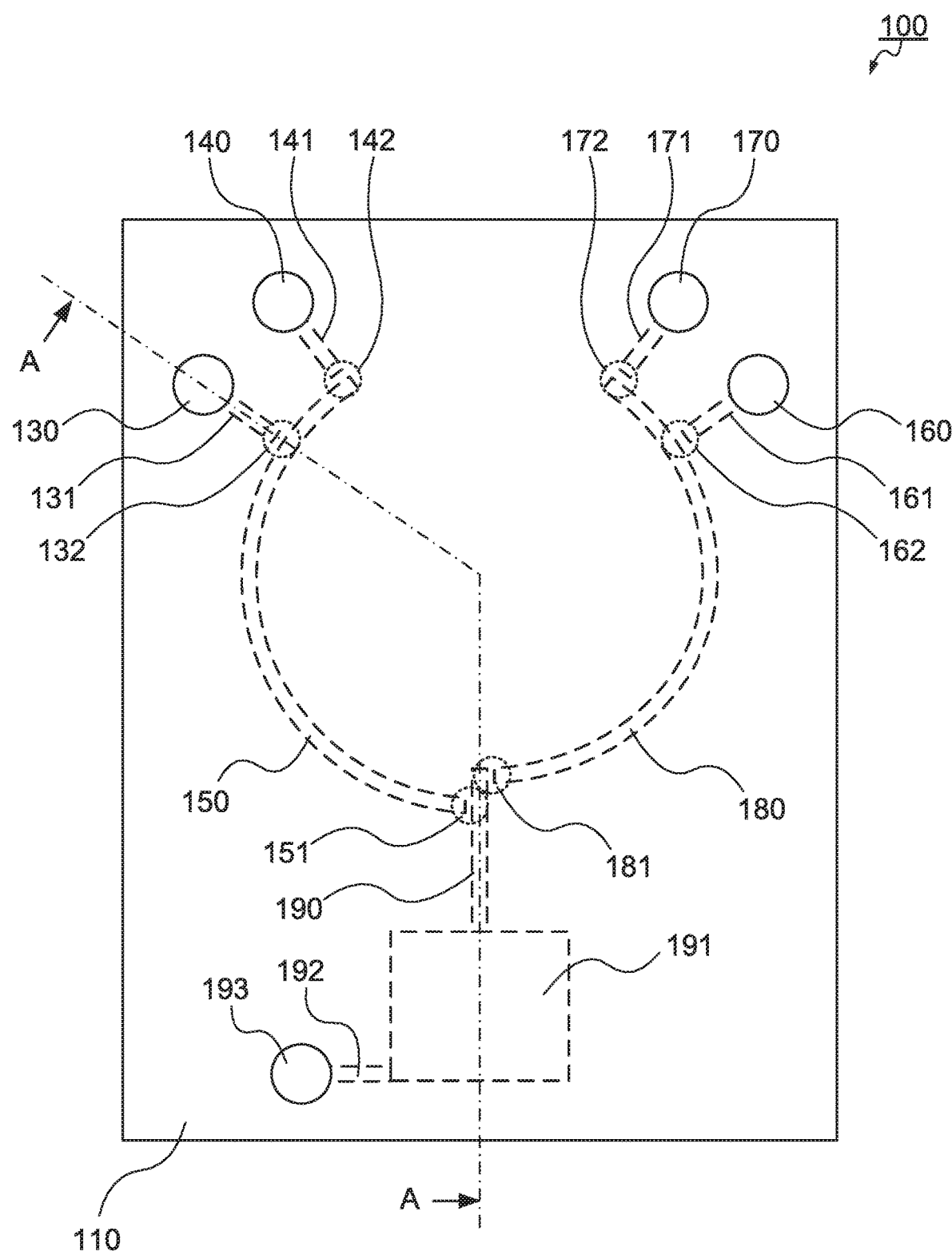
FIG. 2 is a plan view of a fluid handling device according to Embodiment 1.
Figure 3:
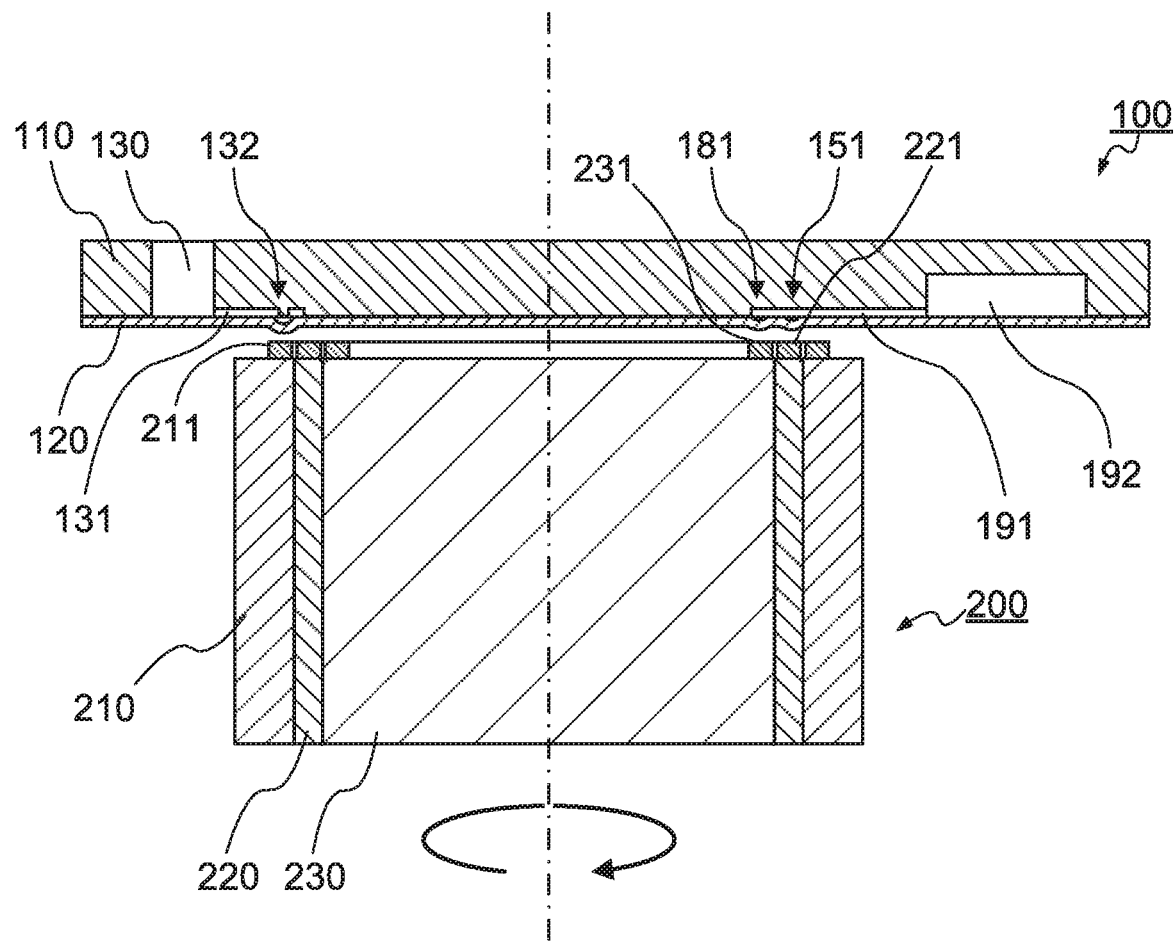
FIG. 3 is a sectional view taken along line A-A of FIG. 2.

FIG. 2 is a plan view of fluid handling device 100 according to Embodiment 1. FIG. 3 is a sectional view taken along line A-A of FIG. 2. FIG. 3 also illustrates a cross-sectional view of rotary member 200 (described later) that is pressed against fluid handling device 100. In FIG. 2, the groove (channel and chamber) formed in the surface of substrate 110 on film 120 side, and the diaphragm formed in film 120 are indicated with the broken line.

Fluid handling device 100 includes substrate 110 and film 120. In substrate 110, a recess (groove) that serves as a channel or a chamber, and a through hole that serves as an inlet or an outlet are formed. Film 120 is joined to one surface of substrate 110 to close the openings of the recess and the through hole formed in substrate 110. A part of film 120 functions as a diaphragm. The recess of substrate 110 closed with film 120 serves as a channel for carrying fluid such as a reagent, a liquid sample, gas, and powder, and/or a chamber for mixing them.

The thickness of substrate 110 is not limited. For example, the thickness of substrate 110 is 1 mm to 10 mm. In addition, the material of substrate 110 is not limited. For example, the material of substrate 110 may be appropriately selected from publicly known resins and glass. Examples of the material of substrate 110 include polyethylene terephthalate, polycarbonate, polymethylmethacrylate, polyvinyl chloride, polypropylene, polyether, polyethylene, polystyrene, silicone resin and elastomer.

The thickness of film 120 is not limited as long as it can function as a diaphragm. For example, the thickness of film 120 is 30 μm to 300 μm. In addition, the material of film 120 is not limited as long as it can function as a diaphragm. For example, the material of film 120 may be appropriately selected from publicly known resins. Examples of the material of film 120 include polyethylene terephthalate, polycarbonate, polymethylmethacrylate, polyvinyl chloride, polypropylene, polyether, polyethylene, polystyrene, silicone resin and elastomer. Film 120 is joined to substrate 110 by thermal welding, laser welding, an adhesive agent or the like, for example.

Fluid handling device 100 according to the present embodiment includes first liquid introduction part 130, first liquid introduction channel 131, third diaphragm valve 132, first washing liquid introduction part 140, first washing liquid introduction channel 141, fourth diaphragm valve 142, first channel 150, first diaphragm valve 151, second liquid introduction part 160, second liquid introduction channel 161, fifth diaphragm valve 162, second washing liquid introduction part 170, second washing liquid introduction channel 171, sixth diaphragm valve 172, second channel 180, second diaphragm valve 181, third channel 190, chamber 191, discharge channel 192 and discharge part 193.

First liquid introduction part 130 is a bottomed recess for introducing first liquid. In the present embodiment, first liquid introduction part 130 is composed of a through hole formed in substrate 110 and film 120 closing one opening of the through hole. The shape and size of first liquid introduction part 130 are not limited, and may be appropriately set as necessary. For example, first liquid introduction part 130 has a substantially columnar shape. First liquid introduction part 130 has a width of approximately 2 mm, for example. The fluid that can be housed in first liquid introduction part 130 may be appropriately selected in accordance with the application of fluid handling device 100. The fluid is fluid such as a reagent, a liquid sample, and powder.

First liquid introduction channel 131 is a channel in which fluid can move. The upstream end of first liquid introduction channel 131 is connected to first liquid introduction part 130. The downstream end of first liquid introduction channel 131 is connected to third diaphragm valve 132. In the present embodiment, first liquid introduction channel 131 is composed of a groove formed in substrate 110 and film 120 closing the opening of the groove. The cross-sectional area and cross-sectional shape of first liquid introduction channel 131 are not limited. A "cross-section of channel" as used herein means a cross-section of a channel orthogonal to the flow direction of the fluid. First liquid introduction channel 131 has a substantially rectangular cross-sectional shape with a length (width and depth) of several tens of micrometers per side, for example. The cross-sectional area of first liquid introduction channel 131 may be or may not be constant in the flow direction of the fluid. In the present embodiment, the cross-sectional area of first liquid introduction channel 131 is constant.

Third diaphragm valve 132 is disposed between first liquid introduction channel 131 and first channel 150, and includes a partition wall and a diaphragm.

The partition wall of third diaphragm valve 132 is a wall disposed between first liquid introduction channel 131 and first channel 150. The partition wall functions as a valve seat of a diaphragm valve for opening and closing between first liquid introduction channel 131 and first channel 150. The shape and height of the partition wall are not limited as long as the above-mentioned function can be ensured. The partition wall has a rectangular prism shape, for example. The height of the partition wall is equal to the depth of first liquid introduction channel 131 and first channel 150, for example.

The diaphragm of third diaphragm valve 132 is a part of film 120 having flexibility, and has a substantially spherical cap shape. Film 120 is disposed on substrate 110 such that the diaphragm is opposite to the partition wall without making contact with the partition wall. The diaphragm deflects toward the partition wall when pressed by first protrusion 211 of first rotary member 210 (described later). That is, the diaphragm functions as a valve element of a diaphragm valve. When first protrusion 211 is not pressing the diaphragm, first liquid introduction channel 131 and first channel 150 are communicated with each other through the gap between the diaphragm and the partition wall. On the other hand, when first protrusion 211 is pressing the diaphragm such that the diaphragm makes contact with the partition wall, first liquid introduction channel 131 and first channel 150 are not communicated with each other.

First washing liquid introduction part 140 is a bottomed recess for introducing washing liquid for washing first channel 150. In the present embodiment, first washing liquid introduction part 140 is composed of a through hole formed in substrate 110 and film 120 closing one opening of the through hole. The shape and size of first washing liquid introduction part 140 are not limited, and may be appropriately set as necessary. First washing liquid introduction part 140 has a substantially columnar shape, for example. First washing liquid introduction part 140 has a width of approximately 2 mm, for example. The type of the washing liquid that can be housed in first washing liquid introduction part 140 may be appropriately selected in accordance with the application of fluid handling device 100. The washing liquid is water, for example.

First washing liquid introduction channel 141 is a channel in which fluid can move. The upstream end of first washing liquid introduction channel 141 is connected to first washing liquid introduction part 140. The downstream end of first washing liquid introduction channel 141 is connected to fourth diaphragm valve 142. In the present embodiment, first washing liquid introduction channel 141 is composed of a groove formed in substrate 110 and film 120 closing the opening of the groove. The cross-sectional area and cross-sectional shape of first washing liquid introduction channel 141 are not limited. First washing liquid introduction channel 141 has a substantially rectangular cross-sectional shape with a length (width and depth) of several tens of micrometers per side, for example. The cross-sectional area of first washing liquid introduction channel 141 may be or may not be constant in the flow direction of the fluid. In the present embodiment, the cross-sectional area of first washing liquid introduction channel 141 is constant.

Fourth diaphragm valve 142 is disposed between first washing liquid introduction channel 141 and first channel 150, and includes a partition wall and a diaphragm.

The partition wall of fourth diaphragm valve 142 is a wall disposed between first washing liquid introduction channel 141 and first channel 150. The partition wall functions as a valve seat of a diaphragm valve for opening and closing between first washing liquid introduction channel 141 and first channel 150. The shape and height of the partition wall are not limited as long as the above-mentioned function can be ensured.

The partition wall has a rectangular prism shape, for example. The height of the partition wall is equal to the depth of first washing liquid introduction channel 141 and first channel 150, for example.

The diaphragm of fourth diaphragm valve 142 is a part of film 120 having flexibility, and has a substantially spherical cap shape. Film 120 is disposed on substrate 110 such that the diaphragm is opposite to the partition wall without making contact with the partition wall. The diaphragm deflects toward the partition wall when pressed by first protrusion 211 of first rotary member 210 (described later). That is, the diaphragm functions as a valve element of a diaphragm valve. When first protrusion 211 is not pressing the diaphragm, first washing liquid introduction channel 141 and first channel 150 are communicated with each other through the gap between the diaphragm and the partition wall. On the other hand, when first protrusion 211 is pressing the diaphragm such that the diaphragm makes contact with the partition wall, first washing liquid introduction channel 141 and first channel 150 are not communicated with each other.

First channel 150 is a channel in which fluid can move. First channel 150 is connected to first liquid introduction part 130 (first liquid introduction channel 131) through third diaphragm valve 132, and is connected to first washing liquid introduction part 140 (first washing liquid introduction channel 141) through fourth diaphragm valve 142. Accordingly, liquid (first liquid) introduced to the first liquid introduction part 130 and liquid (washing liquid) introduced to first washing liquid introduction part 140 flow through first channel 150. Note that fourth diaphragm valve 142 is disposed upstream of first channel 150 relative to third diaphragm valve 132. The downstream end of first channel 150 is connected to first diaphragm valve 151. In the present embodiment, first channel 150 is composed of a groove formed in substrate 110 and film 120 closing the opening of the groove. The cross-sectional area and cross-sectional shape of first channel 150 are not limited. First channel 150 has a substantially rectangular cross-sectional shape with a length (width and depth) of several tens of micrometers per side, for example. The cross-sectional area of first channel 150 may be or may not be constant in the flow direction of the fluid. In the present embodiment, the cross-sectional area of first channel 150 is constant.

First diaphragm valve 151 is disposed between first channel 150 and third channel 190, and includes a partition wall and a diaphragm.

The partition wall of first diaphragm valve 151 is a wall disposed between first channel 150 and third channel 190. The partition wall functions as a valve seat of a diaphragm valve for opening and closing between first channel 150 and third channel 190. The shape and height of the partition wall are not limited as long as the above-mentioned function can be ensured. The partition wall has a rectangular prism shape, for example. The height of the partition wall is equal to the depth of first channel 150 and third channel 190, for example.

The diaphragm of first diaphragm valve 151 is a part of film 120 having flexibility, and has a substantially spherical cap shape. Film 120 is disposed on substrate 110 such that the diaphragm is opposite to the partition wall without making contact with the partition wall. The diaphragm deflects toward the partition wall when pressed by second protrusion 221 of second rotary member 220 (described later). That is, the diaphragm functions as a valve element of a diaphragm valve. When second protrusion 221 is not pressing the diaphragm, first channel 150 and third channel 190 are communicated with each other through the gap between the diaphragm and the partition wall. On the other hand, when second protrusion 221 is pressing the diaphragm such that the diaphragm makes contact with the partition wall, first channel 150 and third channel 190 are not communicated with each other.

Second liquid introduction part 160 is a bottomed recess for introducing second liquid. In the present embodiment, second liquid introduction part 160 is composed of a through hole formed in substrate 110 and film 120 closing one opening of the through hole. The shape and size of second liquid introduction part 160 are not limited, and may be appropriately set as necessary. Second liquid introduction part 160 has a substantially columnar shape, for example. Second liquid introduction part 160 has a width of approximately 2 mm, for example. The fluid that can be housed in second liquid introduction part 160 may be appropriately selected in accordance with the application of fluid handling device 100. The fluid is fluid such as a reagent, a liquid sample, and powder. Normally, the first liquid introduced to first liquid introduction part 130 and the second liquid introduced to second liquid introduction part 160 are liquid of different types.

Second liquid introduction channel 161 is a channel in which fluid can move. The upstream end of second liquid introduction channel 161 is connected to second liquid introduction part 160. The downstream end of second liquid introduction channel 161 is connected to fifth diaphragm valve 162. In the present embodiment, second liquid introduction channel 161 is composed of a groove formed in substrate 110 and film 120 closing the opening of the groove. The cross-sectional area and cross-sectional shape of second liquid introduction channel 161 are not limited. Second liquid introduction channel 161 has a substantially rectangular cross-sectional shape with a length (width and depth) of several tens of micrometers per side, for example. The cross-sectional area of second liquid introduction channel 161 may be or may not be constant in the flow direction of the fluid. In the present embodiment, the cross-sectional area of second liquid introduction channel 161 is constant.

Fifth diaphragm valve 162 is disposed between second liquid introduction channel 161 and second channel 180, and includes a partition wall and a diaphragm.

The partition wall of fifth diaphragm valve 162 is a wall disposed between second liquid introduction channel 161 and second channel 180. The partition wall functions as a valve seat of a diaphragm valve for opening and closing between second liquid introduction channel 161 and second channel 180. The shape and height of the partition wall are not limited as long as the above-mentioned function can be ensured. The partition wall has a rectangular prism shape, for example. The height of the partition wall is equal to the depth of second liquid introduction channel 161 and second channel 180, for example.

The diaphragm of fifth diaphragm valve 162 is a part of film 120 having flexibility, and has a substantially spherical cap shape. Film 120 is disposed on substrate 110 such that the diaphragm is opposite to the partition wall without making contact with the partition wall. The diaphragm deflects toward the partition wall when pressed by first protrusion 211 of first rotary member 210 (described later). That is, the diaphragm functions as a valve element of a diaphragm valve. When first protrusion 211 is not pressing the diaphragm, second liquid introduction channel 161 and second channel 180 are communicated with each other through the gap between the diaphragm and the partition wall. On the other hand, when first protrusion 211 is pressing the diaphragm such that the diaphragm makes contact with the partition wall, second liquid introduction channel 161 and second channel 180 are not communicated with each other.

Second washing liquid introduction part 170 is a bottomed recess for introducing washing liquid for washing second channel 180. In the present embodiment, second washing liquid introduction part 170 is composed of a through hole formed in substrate 110 and film 120 closing one opening of the through hole. The shape and size of second washing liquid introduction part 170 are not limited, and may be appropriately set as necessary. Second washing liquid introduction part 170 has a substantially columnar shape, for example. Second washing liquid introduction part 170 has a width of approximately 2 mm, for example. The type of the washing liquid that can be housed in second washing liquid introduction part 170 may be appropriately selected in accordance with the application of fluid handling device 100. The washing liquid is water, for example. The washing liquid introduced to first washing liquid introduction part 140 and the washing liquid introduced to second washing liquid introduction part 170 may be liquid of the same type, or different types.

Second washing liquid introduction channel 171 is a channel in which fluid can move. The upstream end of second washing liquid introduction channel 171 is connected to second washing liquid introduction part 170. The downstream end of second washing liquid introduction channel 171 is connected to sixth diaphragm valve 172. In the present embodiment, second washing liquid introduction channel 171 is composed of a groove formed in substrate 110 and film 120 closing the opening of the groove. The cross-sectional area and cross-sectional shape of second washing liquid introduction channel 171 are not limited. Second washing liquid introduction channel 171 has a substantially rectangular cross-sectional shape with a length (width and depth) of several tens of micrometers per side, for example. The cross-sectional area of second washing liquid introduction channel 171 may be or may not be constant in the flow direction of the fluid. In the present embodiment, the cross-sectional area of second washing liquid introduction channel 171 is constant.

Sixth diaphragm valve 172 is disposed between second washing liquid introduction channel 171 and second channel 180, and includes a partition wall and a diaphragm.

The partition wall of sixth diaphragm valve 172 is a wall disposed between second washing liquid introduction channel 171 and second channel 180. The partition wall functions as a valve seat of a diaphragm valve for opening and closing between second washing liquid introduction channel 171 and second channel 180. The shape and height of the partition wall are not limited as long as the above-mentioned function can be ensured. The partition wall has a rectangular prism shape, for example. The height of the partition wall is equal to the depth of second washing liquid introduction channel 171 and second channel 180, for example.

The diaphragm of sixth diaphragm valve 172 is a part of film 120 having flexibility, and has a substantially spherical cap shape. Film 120 is disposed on substrate 110 such that the diaphragm is opposite to the partition wall without making contact with the partition wall. The diaphragm deflects toward the partition wall when pressed by first protrusion 211 of first rotary member 210 (described later). That is, the diaphragm functions as a valve element of a diaphragm valve. When first protrusion 211 is not pressing the diaphragm, second washing liquid introduction channel 171 and second channel 180 are communicated with each other through the gap between the diaphragm and the partition wall. On the other hand, when first protrusion 211 is pressing the diaphragm such that the diaphragm makes contact with the partition wall, second washing liquid introduction channel 171 and second channel 180 are not communicated with each other.

Second channel 180 is a channel in which fluid can move. Second channel 180 is connected to second liquid introduction part 160 (second liquid introduction channel 161) through fifth diaphragm valve 162, and is connected to second washing liquid introduction part 170 (second washing liquid introduction channel 171) through sixth diaphragm valve 172. Accordingly, liquid (second liquid) introduced to second liquid introduction part 160 and liquid (washing liquid) introduced to second washing liquid introduction part 170 flow through second channel 180. Note that sixth diaphragm valve 172 is disposed upstream of second channel 180 relative to fifth diaphragm valve 162. The downstream end of second channel 180 is connected to second diaphragm valve 181. In the present embodiment, second channel 180 is composed of a groove formed in substrate 110 and film 120 closing the opening of the groove. The cross-sectional area and cross-sectional shape of second channel 180 are not limited. Second channel 180 has a substantially rectangular cross-sectional shape with a length (width and depth) of several tens of micrometers per side, for example. The cross-sectional area of second channel 180 may be or may not be constant in the flow direction of the fluid. In the present embodiment, the cross-sectional area of second channel 180 is constant.

Second diaphragm valve 181 is disposed between second channel 180 and third channel 190, and includes a partition wall and a diaphragm.

The partition wall of second diaphragm valve 181 is a wall disposed between second channel 180 and third channel 190. The partition wall functions as a valve seat of a diaphragm valve for opening and closing between second channel 180 and third channel 190. The shape and height of the partition wall are not limited as long as the above-mentioned function can be ensured. The partition wall has a rectangular prism shape, for example. The height of the partition wall is equal to the depth of second channel 180 and third channel 190, for example.

The diaphragm of second diaphragm valve 181 is a part of film 120 having flexibility, and has a substantially spherical cap shape. Film 120 is disposed on substrate 110 such that the diaphragm is opposite to the partition wall without making contact with the partition wall. The diaphragm deflects toward the partition wall when pressed by third protrusion 231 of third rotary member 230 (described later). That is, the diaphragm functions as a valve element of a diaphragm valve. When third protrusion 231 is not pressing the diaphragm, second channel 180 and third channel 190 are communicated with each other through the gap between the diaphragm and the partition wall. On the other hand, when third protrusion 231 is pressing the diaphragm such that the diaphragm makes contact with the partition wall, second channel 180 and third channel 190 are not communicated with each other.

Third channel 190 is a channel in which fluid can move. Third channel 190 is connected to first channel 150 through first diaphragm valve 151, and is connected to second channel 180 through second diaphragm valve 181. Accordingly, liquid (e.g., first liquid) flowed through first channel 150 and liquid (e.g., second liquid) flowed through second channel 180 flow through third channel 190. While first diaphragm valve 151 and second diaphragm valve 181 are disposed at positions different from each other in the flow direction of third channel 190 (e.g., the extending direction of third channel 190) in the present embodiment, they may be disposed at the same position in the flow direction of third channel 190. In the present embodiment, second diaphragm valve 181 is disposed upstream of third channel 190 relative to first diaphragm valve 151. The downstream end of third channel 190 is connected to chamber 191. In the present embodiment, third channel 190 is composed of a groove formed in substrate 110 and film 120 closing the opening of the groove. The cross-sectional area and cross-sectional shape of third channel 190 are not limited. Third channel 190 has a substantially rectangular cross-sectional shape with a length (width and depth) of several tens of micrometers per side, for example. The cross-sectional area of third channel 190 may be or may not be constant in the flow direction of the fluid. In the present embodiment, the cross-sectional area of third channel 190 is constant.

Chamber 191 is a space for housing fluid in the inside. In the present embodiment, chamber 191 is composed of a recess formed in substrate 110 and film 120 closing the opening of the recess. The shape and size of chamber 191 are not limited, and may be appropriately adjusted in accordance with the application. Chamber 191 has a substantially cuboid shape, for example. Chamber 191 is connected to the downstream end of third channel 190. In addition, chamber 191 is connected to the upstream end of discharge channel 192.

Discharge channel 192 is a channel in which fluid can move. The upstream end of discharge channel 192 is connected to chamber 191, and the downstream end of discharge channel 192 is connected to discharge part 193. Accordingly, the fluid (such as air and a mixture of the first liquid and the second liquid) in chamber 191 flows into discharge channel 192. In the present embodiment, discharge channel 192 is composed of a groove formed in substrate 110 and film 120 closing the opening of the groove. The cross-sectional area and cross-sectional shape of discharge channel 192 are not limited. Discharge channel 192 has a substantially rectangular cross-sectional shape with a length (width and depth) of several tens of micrometers per side, for example. The cross-sectional area of discharge channel 192 may be or may not be constant in the flow direction of the fluid. In the present embodiment, the cross-sectional area of discharge channel 192 is constant.

Discharge part 193 is a bottomed recess that is connected to chamber 191 through discharge channel 192. Discharge part 193 functions as an air hole, and as an outlet for ejecting liquid in chamber 191. In the present embodiment, discharge part 193 is composed of a through hole formed in substrate 110 and film 120 closing one opening of the through hole. The shape and size of discharge part 193 are not limited, and may be appropriately set as necessary. Discharge part 193 has a substantially columnar shape, for example. Discharge part 193 has a width of approximately 2 mm, for example.

Configuration of Rotary Member

Figure 4:
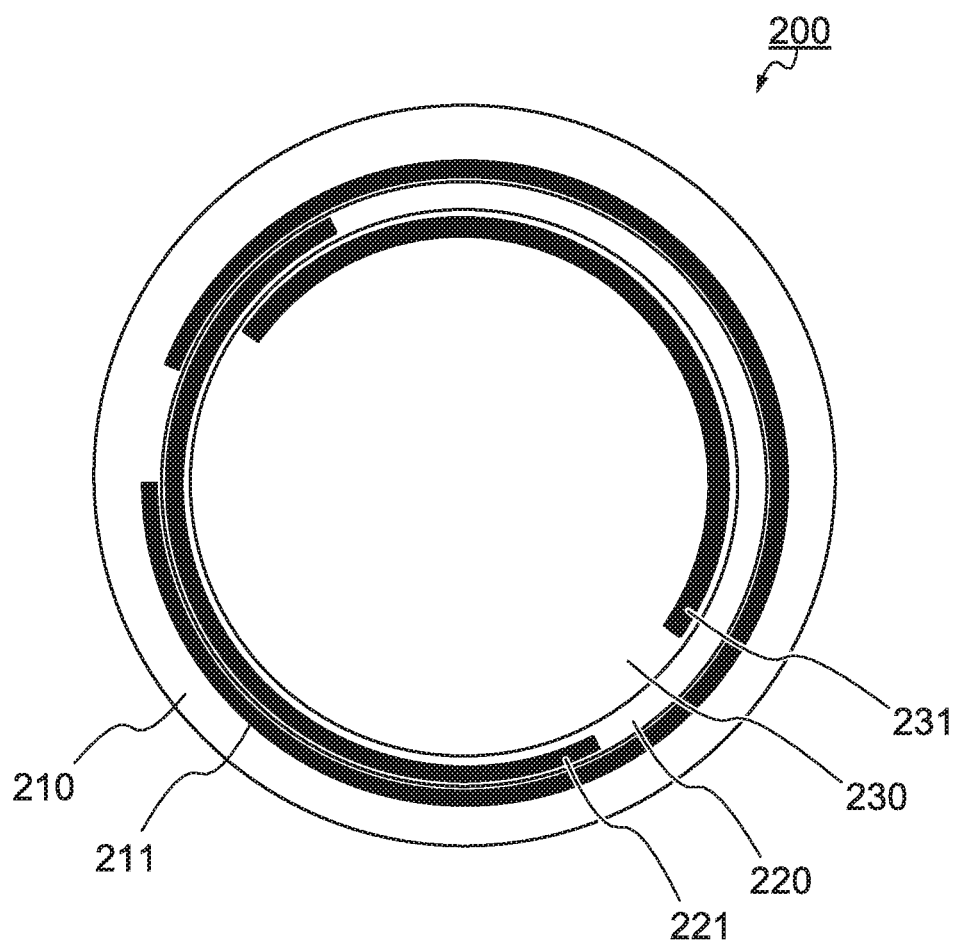
FIG. 4 is a plan view of a rotary member according to Embodiment 1.

FIG. 4 is a plan view of rotary member 200 according to Embodiment 1. In FIG. 4, for the sake of clarity, the top surfaces of first protrusion 211, second protrusion 221 and third protrusion 231 are colored black. In addition, as described above, FIG. 3 illustrates a sectional view of rotary member 200.

Rotary member 200 includes first rotary member 210 having a cylindrical shape, second rotary member 220 having a cylindrical shape, and third rotary member 230 having a columnar shape. Second rotary member 220 is disposed inside first rotary member 210. Third rotary member 230 is disposed inside second rotary member 220. First rotary member 210, second rotary member 220 and third rotary member 230 are rotatable around the same rotation axis. They are separately rotated by an external driving mechanism not illustrated.

First protrusion 211 for pushing the diaphragms of third diaphragm valve 132, fourth diaphragm valve 142, fifth diaphragm valve 162 and sixth diaphragm valve 172 are provided at the upper part of first rotary member 210. Second protrusion 221 for pushing the diaphragm of first diaphragm valve 151 is provided at the upper part of second rotary member 220. Third protrusion 231 for pushing the diaphragm of second diaphragm valve 181 is provided at the upper part of third rotary member 230. Each of first protrusion 211, second protrusion 221 and third protrusion 231 has an arc-like shape in plan view, and first protrusion 211, second protrusion 221 and third protrusion 231 are concentrically disposed.

Operation of Fluid Handling Device

Next, an operation of fluid handling device 100 is described with reference to FIGS. 5A to 5D. In FIGS. 5A to 5D, some components such as the diaphragm are omitted for the sake of clarity. In addition, the portion where the first liquid or the second liquid is present is colored black. Note that it is assumed that the first liquid is housed in first liquid introduction part 130, the second liquid is housed in second liquid introduction part 160, the washing liquid is housed in first washing liquid introduction part 140 and second washing liquid introduction part 170, and a pressure is being exerted on first liquid introduction part 130, second liquid introduction part 160, first washing liquid introduction part 140 and second washing liquid introduction part 170.

Figure 5A:
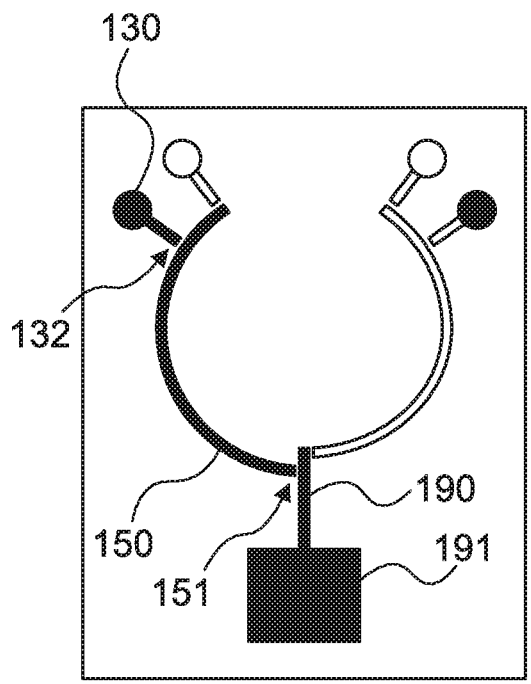
FIGS. 5A to 5D are schematic views for describing an operation of the fluid handling device according to Embodiment 1.

First, each of first rotary member 210, second rotary member 220 and third rotary member 230 is rotated to open third diaphragm valve 132 and first diaphragm valve 151 and close the other diaphragm valves. In this manner, as illustrated in FIG. 5A, the first liquid in first liquid introduction part 130 moves to chamber 191 through first liquid introduction channel 131, third diaphragm valve 132, first channel 150, first diaphragm valve 151 and third channel 190. At this time, second diaphragm valve 181 is closed, and therefore the first liquid does not flow into second channel 180.

Figure 5B:
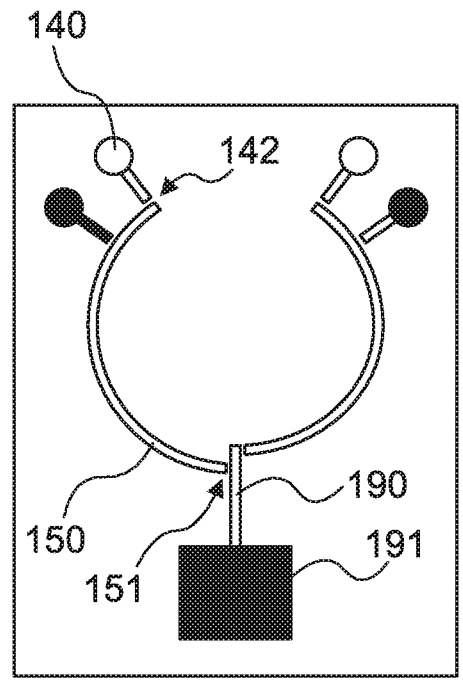

Next, each of first rotary member 210, second rotary member 220 and third rotary member 230 is rotated to open fourth diaphragm valve 142 and first diaphragm valve 151 and close the other diaphragm valves. In this manner, as illustrated in FIG. 5B, the washing liquid in first washing liquid introduction part 140 washes the inside of first washing liquid introduction channel 141, fourth diaphragm valve 142, first channel 150, first diaphragm valve 151 and third channel 190.

Figure 5C:
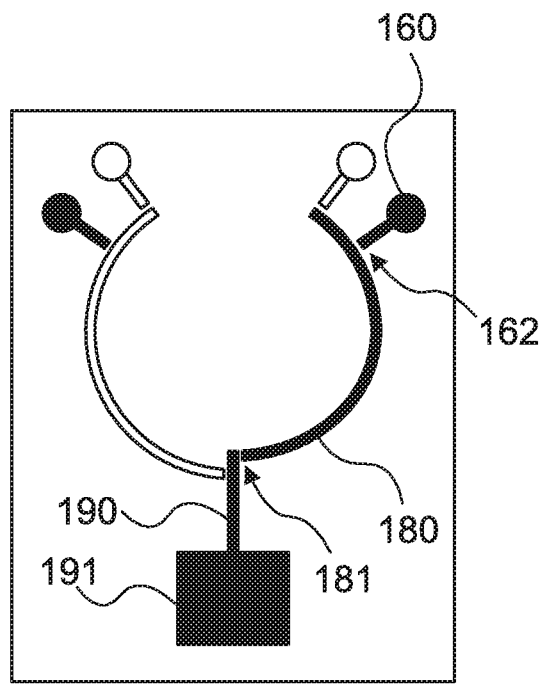

Next, each of first rotary member 210, second rotary member 220 and third rotary member 230 is rotated to open fifth diaphragm valve 162 and second diaphragm valve 181 and close the other diaphragm valves. In this manner, as illustrated in FIG. 5C, the second liquid in second liquid introduction part 160 moves to chamber 191 through second liquid introduction channel 161, fifth diaphragm valve 162, second channel 180, second diaphragm valve 181 and third channel 190. At this time, first diaphragm valve 151 is closed, and therefore the second liquid does not flow into first channel 150.

Figure 5D:
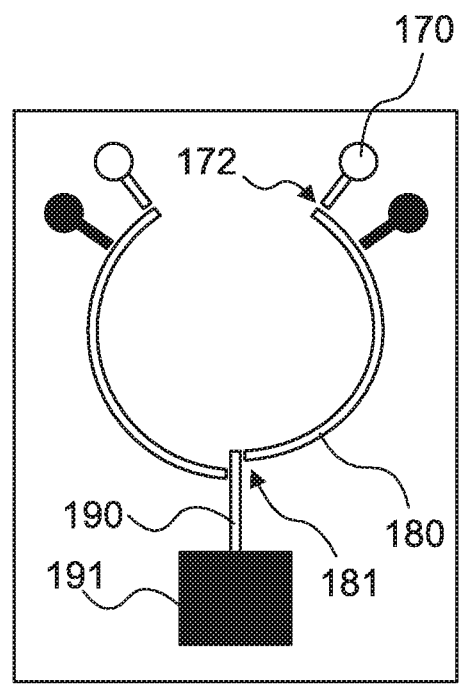

Finally, each of first rotary member 210, second rotary member 220 and third rotary member 230 is rotated to open sixth diaphragm valve 172 and second diaphragm valve 181 and close the other diaphragm valves. In this manner, as illustrated in FIG. 5D, the washing liquid in second washing liquid introduction part 170 washes the inside of second washing liquid introduction channel 171, sixth diaphragm valve 172, second channel 180, second diaphragm valve 181 and third channel 190.

Through the above-mentioned procedure, it is possible to bring the first liquid and the second liquid into contact with each other for the first time in chamber 191 without bringing the first liquid and the second liquid into contact with each other in first channel 150, second channel 180 and third channel 190.

Effect

As described above, fluid handling device 100 according to Embodiment 1 can bring the first liquid and the second liquid into contact with each other for the first time in chamber 191 without bringing the first liquid and the second liquid into contact with each other in first channel 150, second channel 180 and third channel 190.

While fluid handling device 100 includes third diaphragm valve 132, fourth diaphragm valve 142, fifth diaphragm valve 162 and sixth diaphragm valve 172 in the present embodiment, fluid handling device 100 may not include third diaphragm valve 132, fourth diaphragm valve 142, fifth diaphragm valve 162 and sixth diaphragm valve 172.

Figure 6:
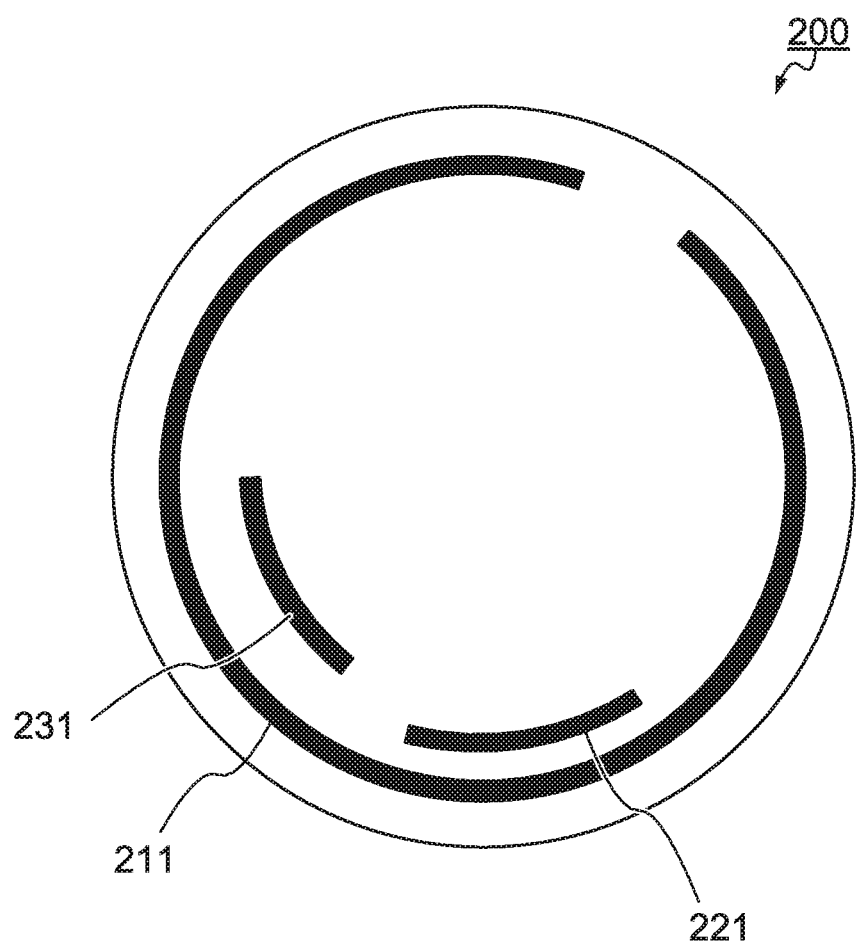
FIG. 6 is a plan view of a unitary rotary member.

In addition, while first rotary member 210, second rotary member 220 and third rotary member 230 are separately rotatable in rotary member 200 in the present embodiment, rotary member 200 may be a unitary member. For example, unitary rotary member 200 illustrated in FIG. 6 may also operate fluid handling device 100 as illustrated in FIGS. 5A to 5D. In unitary rotary member 200, first protrusion 211, second protrusion 221 and third protrusion 231 are disposed such that when first protrusion 211 is not pushing the diaphragm of third diaphragm valve 132 or fourth diaphragm valve 142, second protrusion 221 does not push the diaphragm of first diaphragm valve 151 but third protrusion 231 pushes the diaphragm of second diaphragm valve 181. In addition, first protrusion 211, second protrusion 221 and third protrusion 231 are disposed such that when first protrusion 211 is not pushing the diaphragm of fifth diaphragm valve 162 or sixth diaphragm valve 172, second protrusion 221 pushes the diaphragm of first diaphragm valve 151, but third protrusion 231 does not push the diaphragm of second diaphragm valve 181. In addition, the shape and number of the protrusions provided in the rotary member may be arbitrarily changed.

In addition, while fluid handling device 100 includes the four liquid introduction parts in the present embodiment, fluid handling device 100 may further include another liquid introduction part.

Embodiment 2

Configuration of Fluid Handling Device

Figure 7:
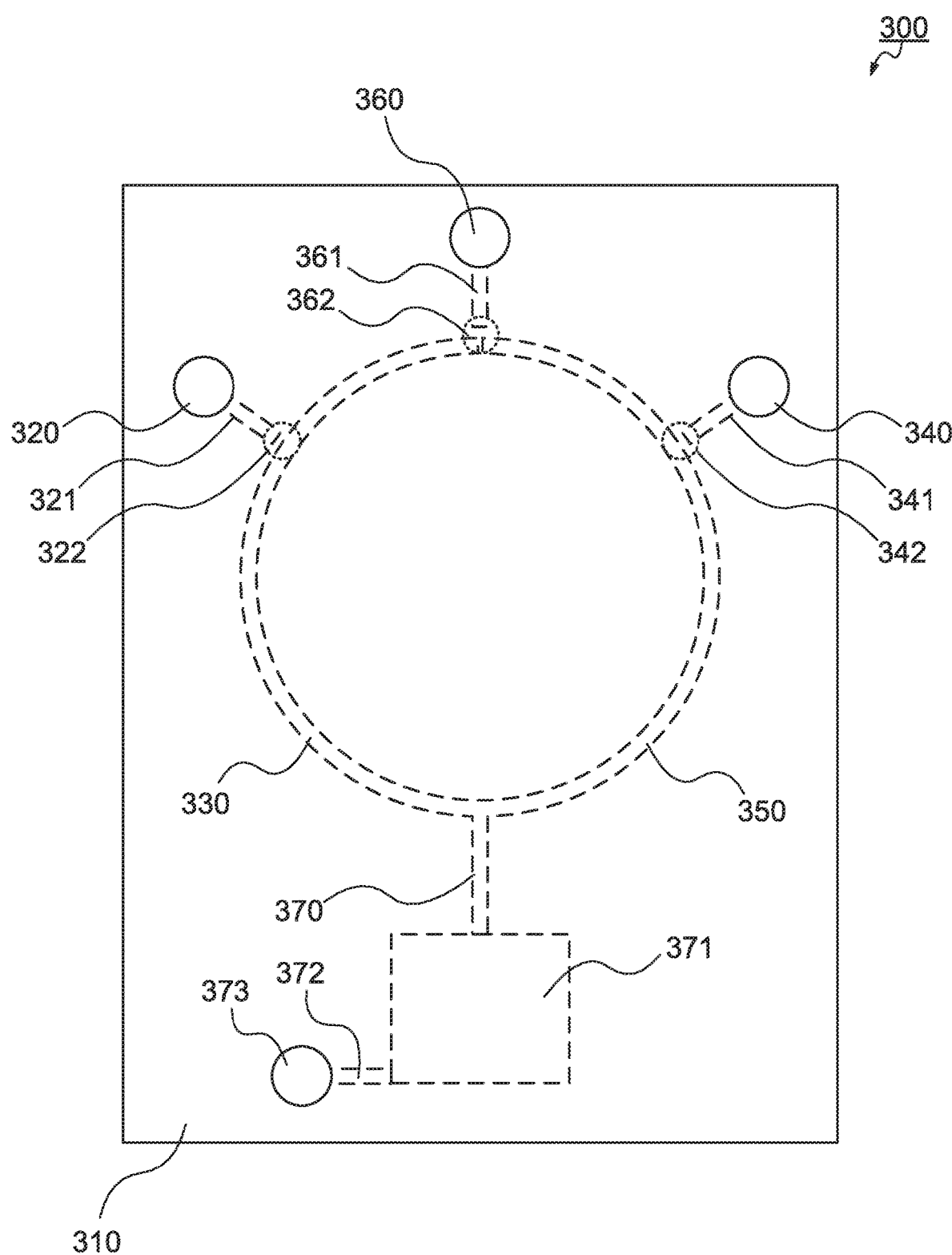
FIG. 7 is a plan view of a fluid handling device according to Embodiment 2.

FIG. 7 is a plan view of fluid handling device 300 according to Embodiment 2. In FIG. 7, the groove (channel and chamber) formed in the surface of substrate 310 on the film side and the diaphragm formed in the film are indicated with the broken line.

Fluid handling device 300 includes substrate 310 and a film (see FIG. 3). In substrate 310, a recess (groove) that serves as a channel or a chamber, and a through hole that serves as an inlet or an outlet are formed. The film is joined to one surface of substrate 310 to close the openings of the recess and the through hole formed in substrate 310. A part of the film functions as a diaphragm. The recess of substrate 310 closed with the film serves as a channel for carrying fluid such as a reagent, a liquid sample, gas, and powder, and/or a chamber for mixing them.

The thickness of substrate 310 is not limited. For example, the thickness of substrate 310 is 1 mm to 10 mm. In addition, the material of substrate 310 is not limited. For example, the material of substrate 310 may be appropriately selected from publicly known resins and glass. Examples of the material of substrate 310 include polyethylene terephthalate, polycarbonate, polymethylmethacrylate, polyvinyl chloride, polypropylene, polyether, polyethylene, polystyrene, silicone resin and elastomer.

The thickness of the film is not limited as long as it can function as a diaphragm. For example, the thickness of the film is 30 μm to 300 μm. In addition, the material of the film is not limited as long as it can function as a diaphragm. For example, the material of the film may be appropriately selected from publicly known resins. Examples of the material of the film include polyethylene terephthalate, polycarbonate, polymethylmethacrylate, polyvinyl chloride, polypropylene, polyether, polyethylene, polystyrene, silicone resin and elastomer. The film is joined to substrate 310 by thermal welding, laser welding, an adhesive agent or the like, for example.

Fluid handling device 300 according to the present embodiment includes first liquid introduction part 320, first liquid introduction channel 321, second diaphragm valve 322, first channel 330, second liquid introduction part 340, second liquid introduction channel 341, third diaphragm valve 342, second channel 350, washing liquid introduction part 360, washing liquid introduction channel 361, first diaphragm valve 362, third channel 370, and chamber 371.

First liquid introduction part 320 is a bottomed recess for introducing first liquid. In the present embodiment, first liquid introduction part 320 is composed of a through hole formed in substrate 310 and a film closing one opening of the through hole. The shape and size of first liquid introduction part 320 are not limited, and may be appropriately set as necessary. First liquid introduction part 320 has a substantially columnar shape, for example. First liquid introduction part 320 has a width of approximately 2 mm, for example. The fluid that can be housed in first liquid introduction part 320 may be appropriately selected in accordance with the application of fluid handling device 300. The fluid is fluid such as a reagent, a liquid sample, and powder.

First liquid introduction channel 321 is a channel in which fluid can move. The upstream end of first liquid introduction channel 321 is connected to first liquid introduction part 320. The downstream end of first liquid introduction channel 321 is connected to second diaphragm valve 322. In the present embodiment, first liquid introduction channel 321 is composed of a groove formed in substrate 310 and a film closing the opening of the groove. The cross-sectional area and cross-sectional shape of first liquid introduction channel 321 are not limited. As described above, A "cross-section of channel" as used herein means a cross-section of a channel orthogonal to the flow direction of the fluid. First liquid introduction channel 321 has a substantially rectangular cross-sectional shape with a length (width and depth) of several tens of micrometers per side, for example. The cross-sectional area of first liquid introduction channel 321 may be or may not be constant in the flow direction of the fluid. In the present embodiment, the cross-sectional area of first liquid introduction channel 321 is constant.

Second diaphragm valve 322 is disposed between first liquid introduction channel 321 and first channel 330, and includes a partition wall and a diaphragm.

The partition wall of second diaphragm valve 322 is a wall disposed between first liquid introduction channel 321 and first channel 330. The partition wall functions as a valve seat of a diaphragm valve for opening and closing between first liquid introduction channel 321 and first channel 330. The shape and height of the partition wall are not limited as long as the above-mentioned function can be ensured. The partition wall has a rectangular prism shape, for example. The height of the partition wall is equal to the depth of first liquid introduction channel 321 and first channel 330, for example.

The diaphragm of second diaphragm valve 322 is a part of a film having flexibility, and has a substantially spherical cap shape. The film is disposed on substrate 310 such that the diaphragm is opposite to the partition wall without making contact with the partition wall. The diaphragm deflects toward the partition wall when pressed by protrusion 401 of rotary member 400 (described later). That is, the diaphragm functions as a valve element of a diaphragm valve. When protrusion 401 is not pressing the diaphragm, first liquid introduction channel 321 and first channel 330 are communicated with each other through the gap between the diaphragm and the partition wall. On the other hand, when protrusion 401 is pressing the diaphragm such that the diaphragm makes contact with the partition wall, first liquid introduction channel 321 and first channel 330 are not communicated with each other.

First channel 330 is a channel in which fluid can move. First channel 330 is connected to first liquid introduction part 320 (first liquid introduction channel 321) through second diaphragm valve 322. Accordingly, liquid (first liquid) introduced to first liquid introduction part 320 flows through first channel 330. In addition, as described later, the upstream end of first channel 330 is connected to washing liquid introduction part 360 (washing liquid introduction channel 361) through first diaphragm valve 362. Accordingly, liquid (washing liquid) introduced to washing liquid introduction part 360 also flows through first channel 330. Note that first diaphragm valve 362 is disposed upstream of first channel 330 relative to second diaphragm valve 322. The downstream end of first channel 330 is connected to third channel 370. In the present embodiment, first channel 330 is composed of a groove formed in substrate 310 and a film closing the opening of the groove. The cross-sectional area and cross-sectional shape of first channel 330 are not limited. First channel 330 has a substantially rectangular cross-sectional shape with a length (width and depth) of several tens of micrometers per side, for example. The cross-sectional area of first channel 330 may be or may not be constant in the flow direction of the fluid. In the present embodiment, the cross-sectional area of first channel 330 is constant.

Second liquid introduction part 340 is a bottomed recess for introducing second liquid. In the present embodiment, second liquid introduction part 340 is composed of a through hole formed in substrate 310 and a film closing one opening of the through hole. The shape and size of second liquid introduction part 340 are not limited, and may be appropriately set as necessary. Second liquid introduction part 340 has a substantially columnar shape, for example. Second liquid introduction part 340 has a width of approximately 2 mm, for example. The fluid that can be housed in second liquid introduction part 340 may be appropriately selected in accordance with the application of fluid handling device 300. The fluid is fluid such as a reagent, a liquid sample, and powder. Normally, the first liquid introduced to first liquid introduction part 320 and the second liquid introduced to second liquid introduction part 340 are liquid of different types.

Second liquid introduction channel 341 is a channel in which fluid can move. The upstream end of second liquid introduction channel 341 is connected to second liquid introduction part 340. The downstream end of second liquid introduction channel 341 is connected to third diaphragm valve 342. In the present embodiment, second liquid introduction channel 341 is composed of a groove formed in substrate 310 and a film closing the opening of the groove. The cross-sectional area and cross-sectional shape of second liquid introduction channel 341 are not limited. Second liquid introduction channel 341 has a substantially rectangular cross-sectional shape with a length (width and depth) of several tens of micrometers per side, for example. The cross-sectional area of second liquid introduction channel 341 may be or may not be constant in the flow direction of the fluid. In the present embodiment, the cross-sectional area of second liquid introduction channel 341 is constant.

Third diaphragm valve 342 is disposed between second liquid introduction channel 341 and second channel 350, and includes a partition wall and a diaphragm.

The partition wall of third diaphragm valve 342 is a wall disposed between second liquid introduction channel 341 and second channel 350. The partition wall functions as a valve seat of a diaphragm valve for opening and closing between second liquid introduction channel 341 and second channel 350. The shape and height of the partition wall are not limited as long as the above-mentioned function can be ensured. The partition wall has a rectangular prism shape, for example. The height of the partition wall is equal to the depth of second liquid introduction channel 341 and second channel 350, for example.

The diaphragm of third diaphragm valve 342 is a part of a film having flexibility, and has a substantially spherical cap shape. The film is disposed on substrate 310 such that the diaphragm is opposite to the partition wall without making contact with the partition wall. The diaphragm deflects toward the partition wall when pressed by protrusion 401 of rotary member 400 (described later). That is, the diaphragm functions as a valve element of a diaphragm valve. When protrusion 401 is not pressing the diaphragm, second liquid introduction channel 341 and second channel 350 are communicated with each other through the gap between the diaphragm and the partition wall. On the other hand, when protrusion 401 is pressing the diaphragm such that the diaphragm makes contact with the partition wall, second liquid introduction channel 341 and second channel 350 are not communicated with each other.

Second channel 350 is a channel in which fluid can move. Second channel 350 is connected to second liquid introduction part 340 (second liquid introduction channel 341) through third diaphragm valve 342. Accordingly, liquid (second liquid) introduced to second liquid introduction part 340 flows through second channel 350. In addition, as described later, the upstream end of second channel 350 is connected to washing liquid introduction part 360 (washing liquid introduction channel 361) through first diaphragm valve 362. Accordingly, liquid (washing liquid) introduced to washing liquid introduction part 360 also flows through second channel 350. Note that first diaphragm valve 362 is disposed upstream of second channel 350 relative to third diaphragm valve 342. In addition, a partition wall is disposed between the upstream end of first channel 330 and second channel 350. Accordingly, when the diaphragm of first diaphragm valve 362 is in contact with the partition wall, first channel 330 and second channel 350 are not communicated with each other. The downstream end of second channel 350 is connected to third channel 370. In the present embodiment, second channel 350 is composed of a groove formed in substrate 310 and a film closing the opening of the groove. The cross-sectional area and cross-sectional shape of second channel 350 are not limited. Second channel 350 has a substantially rectangular cross-sectional shape with a length (width and depth) of several tens of micrometers per side, for example. The cross-sectional area of second channel 350 may be or may not be constant in the flow direction of the fluid. In the present embodiment, the cross-sectional area of second channel 350 is constant.

Washing liquid introduction part 360 is a bottomed recess for introducing washing liquid for washing first channel 330 and second channel 350. In the present embodiment, washing liquid introduction part 360 is composed of a through hole formed in substrate 310 and a film closing one opening of the through hole. The shape and size of washing liquid introduction part 360 are not limited, and may be appropriately set as necessary. Washing liquid introduction part 360 has a substantially columnar shape, for example. Washing liquid introduction part 360 has a width of approximately 2 mm, for example. The type of the washing liquid that can be housed in washing liquid introduction part 360 may be appropriately selected in accordance with the application of fluid handling device 300. The washing liquid is water, for example.

Washing liquid introduction channel 361 is a channel in which fluid can move. The upstream end of washing liquid introduction channel 361 is connected to washing liquid introduction part 360. The downstream end of washing liquid introduction channel 361 is connected to first diaphragm valve 362. In the present embodiment, washing liquid introduction channel 361 is composed of a groove formed in substrate 310 and a film closing the opening of the groove. The cross-sectional area and cross-sectional shape of washing liquid introduction channel 361 are not limited. Washing liquid introduction channel 361 has a substantially rectangular cross-sectional shape with a length (width and depth) of several tens of micrometers per side, for example. The cross-sectional area of washing liquid introduction channel 361 may be or may not be constant in the flow direction of the fluid. In the present embodiment, the cross-sectional area of washing liquid introduction channel 361 is constant.

First diaphragm valve 362 is disposed between washing liquid introduction channel 361, and first channel 330 and second channel 350, and includes a partition wall and a diaphragm.

The partition wall of first diaphragm valve 362 is a wall disposed between washing liquid introduction channel 361, and first channel 330 and second channel 350. The partition wall functions as a valve seat of a diaphragm valve for opening and closing between washing liquid introduction channel 361, and first channel 330 and second channel 350. The shape and height of the partition wall are not limited as long as the above-mentioned function can be ensured. The partition wall has a rectangular prism shape, for example. The height of the partition wall is equal to the depth of washing liquid introduction channel 361, first channel 330 and second channel 350, for example.

The diaphragm of first diaphragm valve 362 is a part of a film having flexibility, and has a substantially spherical cap shape. The film is disposed on substrate 310 such that the diaphragm is opposite to the partition wall without making contact with the partition wall. The diaphragm deflects toward the partition wall when pressed by protrusion 401 of rotary member 400 (described later). That is, the diaphragm functions as a valve element of a diaphragm valve. When protrusion 401 is not pressing the diaphragm, washing liquid introduction channel 361, and first channel 330 and second channel 350 are communicated with each other through the gap between the diaphragm and the partition wall. On the other hand, when protrusion 401 is pressing the diaphragm such that the diaphragm makes contact with the partition wall, washing liquid introduction channel 361, and first channel 330 and second channel 350 are not communicated with each other.

Third channel 370 is a channel in which fluid can move. The upstream end of third channel 370 is connected to the downstream end of first channel 330 and the downstream end of second channel 350. Accordingly, liquid (e.g., first liquid) flowed through first channel 330 and liquid (e.g., second liquid) flowed through second channel 350 flows through third channel 370. The downstream end of third channel 370 is connected to chamber 371. In the present embodiment, third channel 370 is composed of a groove formed in substrate 310 and a film closing the opening of the groove. The cross-sectional area and cross-sectional shape of third channel 370 are not limited. Third channel 370 has a substantially rectangular cross-sectional shape with a length (width and depth) of several tens of micrometers per side, for example. The cross-sectional area of third channel 370 may be or may not be constant in the flow direction of the fluid. In the present embodiment, the cross-sectional area of third channel 370 is constant.

Chamber 371 is a space for housing fluid in the inside. In the present embodiment, chamber 371 is composed of a recess formed in substrate 310 and a film closing the opening of the recess. The shape and size of chamber 371 are not limited, and may be appropriately adjusted in accordance with the application. Chamber 371 has a substantially cuboid shape, for example. Chamber 371 is connected to the downstream end of third channel 370. In addition, chamber 371 is connected to the upstream end of discharge channel 372.

Discharge channel 372 is a channel in which fluid can move. The upstream end of discharge channel 372 is connected to chamber 371, and the downstream end of discharge channel 372 is connected to discharge part 373. Accordingly, the fluid (such as air and a mixture of the first liquid and the second liquid) in chamber 371 flows into discharge channel 372. In the present embodiment, discharge channel 372 is composed of a groove formed in substrate 310 and a film closing the opening of the groove. The cross-sectional area and cross-sectional shape of discharge channel 372 are not limited. Discharge channel 372 has a substantially rectangular cross-sectional shape with a length (width and depth) of several tens of micrometers per side, for example. The cross-sectional area of discharge channel 372 may be or may not be constant in the flow direction of the fluid. In the present embodiment, the cross-sectional area of discharge channel 372 is constant.

Discharge part 373 is a bottomed recess connected to chamber 371 through discharge channel 372. Discharge part 373 functions as an air hole, and as an outlet for ejecting liquid in chamber 371. In the present embodiment, discharge part 373 is composed of a through hole formed in substrate 310 and a film closing one opening of the through hole. The shape and size of discharge part 373 are not limited, and may be appropriately set as necessary. Discharge part 373 has a substantially columnar shape, for example. Discharge part 373 has a width of approximately 2 mm, for example.

Configuration of Rotary Member

Figure 8:
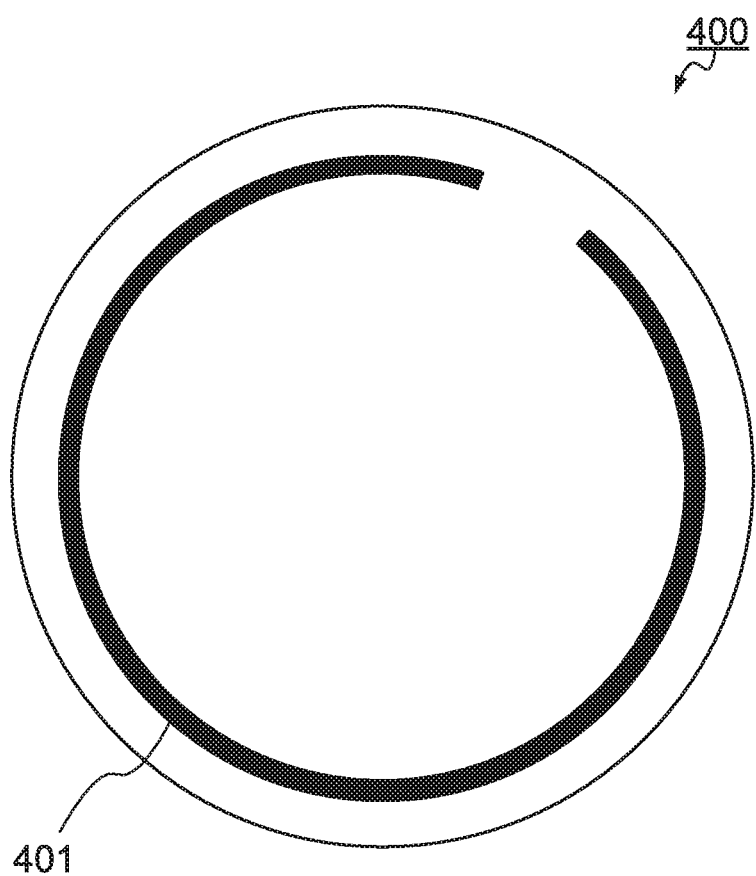
FIG. 8 is a plan view of a rotary member according to Embodiment 2.

FIG. 8 is a plan view of rotary member 400 according to Embodiment 2. In FIG. 8, for the sake of clarity, the top surface of protrusion 401 is colored black.

Rotary member 400 is a columnar member, and is rotatable around a rotation axis. Rotary member 400 is rotated by an external driving mechanism not illustrated.

At the upper part of rotary member 400, protrusion 401 for pushing the diaphragms of first diaphragm valve 362, second diaphragm valve 322 and third diaphragm valve 342 is provided. Protrusion 401 has an arc-like shape in plan view.

Operation of Fluid Handling Device

Next, an operation of fluid handling device 300 is described with reference to FIGS. 9A to 9D. In FIGS. 9A to 9D, some components such as the diaphragm are omitted for the sake of clarity. In addition, the portion where the first liquid or the second liquid is present is colored black. Note that it is assumed that the first liquid is housed in first liquid introduction part 320, the second liquid is housed in second liquid introduction part 340, the washing liquid is housed in washing liquid introduction part 360, and a pressure is being exerted on first liquid introduction part 320, second liquid introduction part 340 and washing liquid introduction part 360.

Figure 9A:
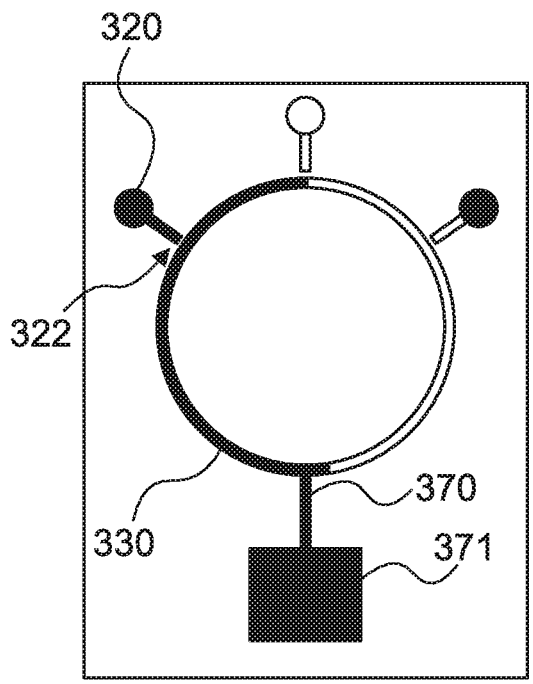
FIGS. 9A to 9D are schematic views for describing an operation of the fluid handling device according to Embodiment 2.

First, rotary member 400 is rotated to open second diaphragm valve 322 and close the other diaphragm valves. In this manner, as illustrated in FIG. 9A, the first liquid in first liquid introduction part 320 moves to chamber 371 through first liquid introduction channel 321, second diaphragm valve 322, first channel 330 and third channel 370. At this time, a part of the first liquid may flow into the downstream part of second channel 350.

Figure 9B:
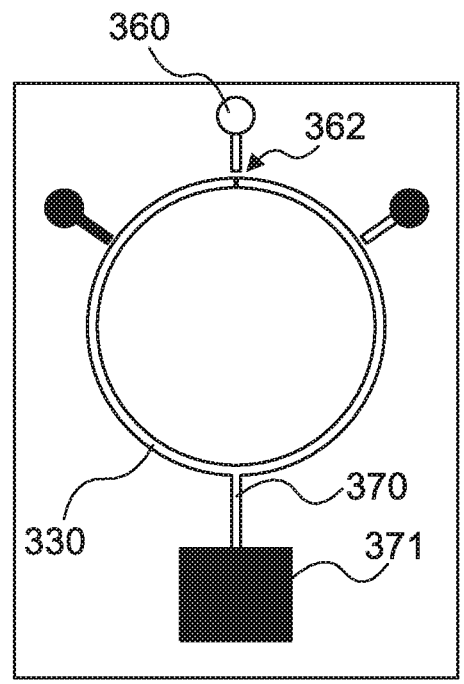

Next, rotary member 400 is rotated to open first diaphragm valve 362 and close the other diaphragm valves. In this manner, as illustrated in FIG. 9B, the washing liquid in washing liquid introduction part 360 washes the inside of washing liquid introduction channel 361, first diaphragm valve 362, first channel 330, second channel 350 and third channel 370. In this manner, the first liquid entered second channel 350 is removed.

Figure 9C:
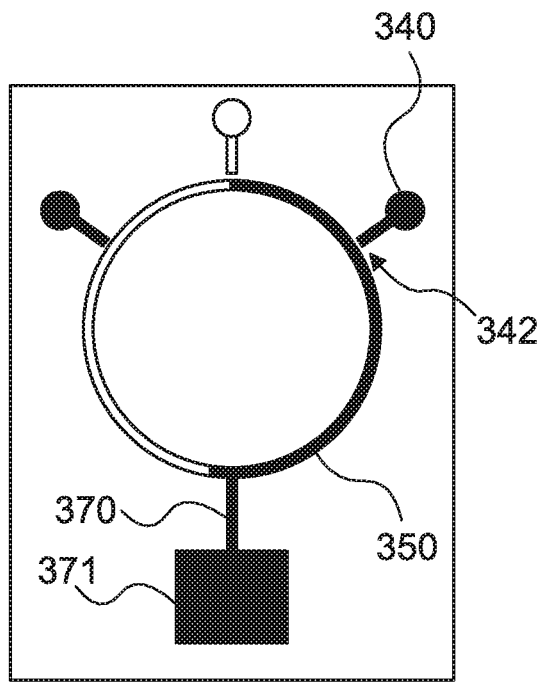

Next, rotary member 400 is rotated to open third diaphragm valve 342 and close the other diaphragm valves. In this manner, as illustrated in FIG. 9C, the second liquid in second liquid introduction part 340 moves to chamber 371 through second liquid introduction channel 341, third diaphragm valve 342, second channel 350 and third channel 370. At this time, a part of the second liquid may flow into the downstream part of first channel 330.

Figure 9D:
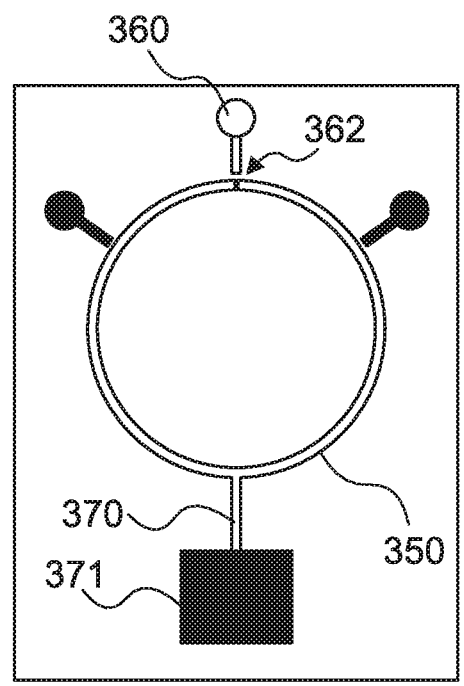

Finally, rotary member 400 is rotated to open first diaphragm valve 362 and close the other diaphragm valves. In this manner, as illustrated in FIG. 9D, the washing liquid in washing liquid introduction part 360 washes the inside of washing liquid introduction channel 361, first diaphragm valve 362, first channel 330, second channel 350 and third channel 370. In this manner, the second liquid entered first channel 330 is removed.

Through the above-mentioned procedure, it is possible to bring the first liquid and the second liquid into contact with each other for the first time in chamber 371 without bringing the first liquid and the second liquid into contact with each other in first channel 330, second channel 350 and third channel 370.

Effect

As described above, fluid handling device 300 according to Embodiment 2 can bring the first liquid and the second liquid into contact with each other for the first time in chamber 371 without bringing the first liquid and the second liquid into contact with each other in first channel 330, second channel 350 and third channel 370.

While fluid handling device 300 includes second diaphragm valve 322 and third diaphragm valve 342 in the present embodiment, fluid handling device 300 may not include second diaphragm valve 322 and third diaphragm valve 342.

While fluid handling device 300 includes the three liquid introduction parts in the present embodiment, fluid handling device 300 may further include another liquid introduction part.

Embodiment 3

Configuration of Fluid Handling Device

Figure 10:
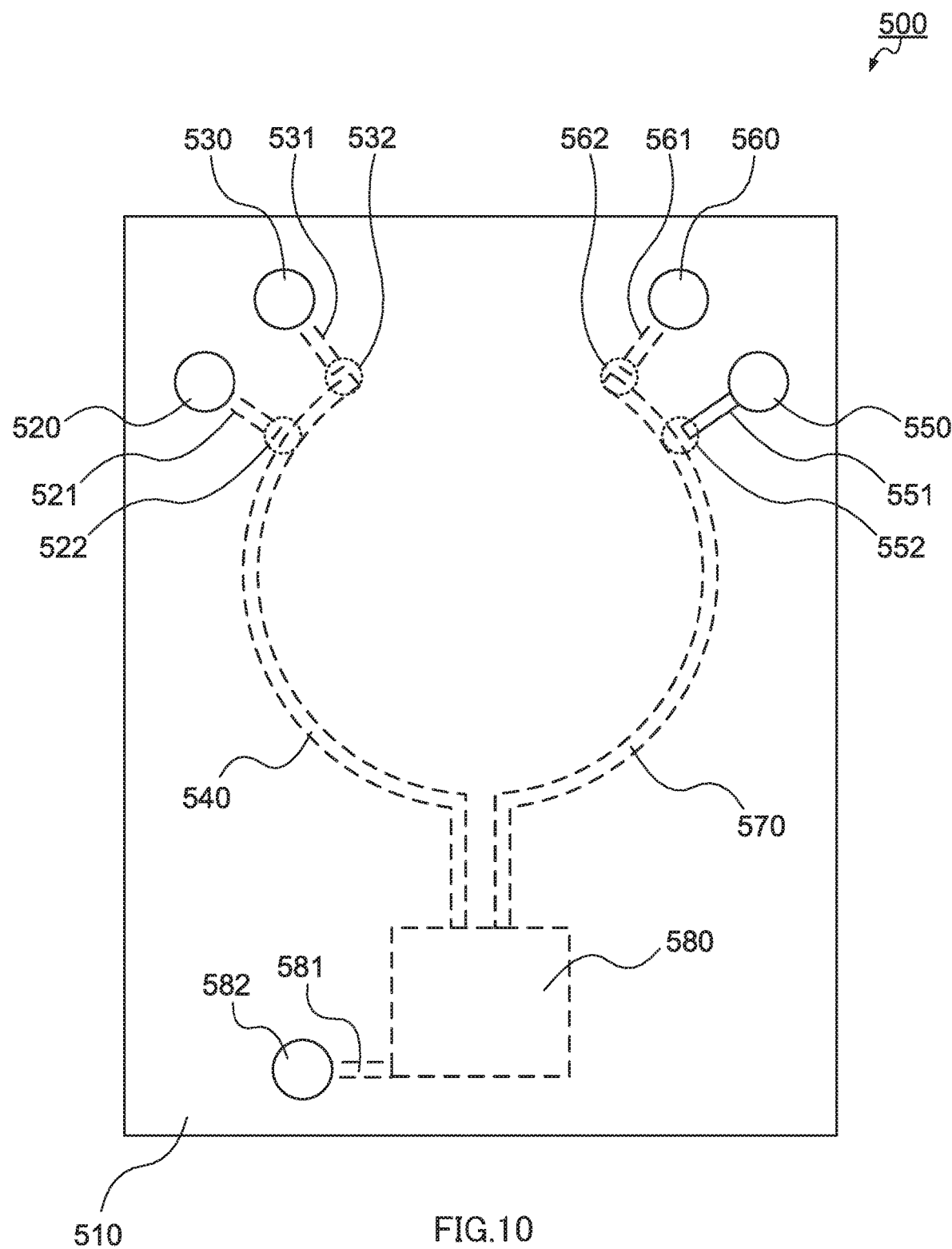
FIG. 10 is a plan view of a fluid handling device according to Embodiment 3.

FIG. 10 is a plan view of fluid handling device 500 according to Embodiment 3. In FIG. 10, the groove (channel and chamber) formed in the surface of substrate 510 on the film side and the diaphragm formed in the film are illustrated with the broken line.

Fluid handling device 500 includes substrate 510 and a film (see FIG. 3). In substrate 510, a recess (groove) that serves as a channel or a chamber, and a through hole that serves as an inlet or an outlet are formed. The film is joined to one surface of substrate 510 to close the openings of the recess and the through hole formed in substrate 510. A part of the film functions as a diaphragm. The recess of substrate 510 closed with the film serves as a channel for carrying fluid such as a reagent, a liquid sample, gas, and powder, and/or a chamber for mixing them.

The thickness of substrate 510 is not limited. For example, the thickness of substrate 510 is 1 mm to 10 mm. In addition, the material of substrate 510 is not limited. For example, the material of substrate 510 may be appropriately selected from publicly known resins and glass. Examples of the material of substrate 510 include polyethylene terephthalate, polycarbonate, polymethylmethacrylate, polyvinyl chloride, polypropylene, polyether, polyethylene, polystyrene, silicone resin and elastomer.

The thickness of the film is not limited as long as it can function as a diaphragm. For example, the thickness of the film is 30 μm to 300 μm. In addition, the material of the film is not limited as long as it can function as a diaphragm. For example, the material of the film may be appropriately selected from publicly known resins. Examples of the material of the film include polyethylene terephthalate, polycarbonate, polymethylmethacrylate, polyvinyl chloride, polypropylene, polyether, polyethylene, polystyrene, silicone resin and elastomer. The film is joined to substrate 510 by thermal welding, laser welding, an adhesive agent or the like, for example.

Fluid handling device 500 according to the present embodiment includes first liquid introduction part 520, first liquid introduction channel 521, first diaphragm valve 522, first washing liquid introduction part 530, first washing liquid introduction channel 531, second diaphragm valve 532, first channel 540, second liquid introduction part 550, second liquid introduction channel 551, third diaphragm valve 552, second washing liquid introduction part 560, second washing liquid introduction channel 561, fourth diaphragm valve 562, second channel 570, chamber 580, and discharge channel 581.

First liquid introduction part 520 is a bottomed recess for introducing first liquid. In the present embodiment, first liquid introduction part 520 is composed of a through hole formed in substrate 510 and a film closing one opening of the through hole. The shape and size of first liquid introduction part 520 are not limited, and may be appropriately set as necessary. First liquid introduction part 520 has a substantially columnar shape, for example. First liquid introduction part 520 has a width of approximately 2 mm, for example. The fluid that can be housed in first liquid introduction part 520 may be appropriately selected in accordance with the application of fluid handling device 500. The fluid is fluid such as a reagent, a liquid sample, and powder.

First liquid introduction channel 521 is a channel in which fluid can move. The upstream end of first liquid introduction channel 521 is connected to first liquid introduction part 520. The downstream end of first liquid introduction channel 521 is connected to first diaphragm valve 522. In the present embodiment, first liquid introduction channel 521 is composed of a groove formed in substrate 510 and a film closing the opening of the groove. The cross-sectional area and cross-sectional shape of first liquid introduction channel 521 are not limited. As described above, A "cross-section of channel" as used herein means a cross-section of a channel orthogonal to the flow direction of the fluid. First liquid introduction channel 521 has a substantially rectangular cross-sectional shape with a length (width and depth) of several tens of micrometers per side, for example. The cross-sectional area of first liquid introduction channel 521 may be or may not be constant in the flow direction of the fluid. In the present embodiment, the cross-sectional area of first liquid introduction channel 521 is constant.

First diaphragm valve 522 is disposed between first liquid introduction channel 521 and first channel 540, and includes a partition wall and a diaphragm.

The partition wall of first diaphragm valve 522 is a wall disposed between first liquid introduction channel 521 and first channel 540. The partition wall functions as a valve seat of a diaphragm valve for opening and closing between first liquid introduction channel 521 and first channel 540. The shape and height of the partition wall are not limited as long as the above-mentioned function can be ensured. The partition wall has a rectangular prism shape, for example. The height of the partition wall is equal to the depth of first liquid introduction channel 521 and first channel 540, for example.

The diaphragm of first diaphragm valve 522 is a part of a film having flexibility, and has a substantially spherical cap shape. The film is disposed on substrate 510 such that the diaphragm is opposite to the partition wall without making contact with the partition wall. The diaphragm deflects toward the partition wall when pressed by protrusion 601 of rotary member 600 (described later). That is, the diaphragm functions as a valve element of a diaphragm valve. When protrusion 601 is not pressing the diaphragm, first liquid introduction channel 521 and first channel 540 are communicated with each other through the gap between the diaphragm and the partition wall. On the other hand, when protrusion 601 is pressing the diaphragm such that the diaphragm makes contact with the partition wall, first liquid introduction channel 521 and first channel 540 are not communicated with each other.

First washing liquid introduction part 530 is a bottomed recess for introducing washing liquid for washing first channel 540. In the present embodiment, first washing liquid introduction part 530 is composed of a through hole formed in substrate 510 and a film closing one opening of the through hole. The shape and size of first washing liquid introduction part 530 are not limited, and may be appropriately set as necessary. First washing liquid introduction part 530 has a substantially columnar shape, for example. First washing liquid introduction part 530 has a width of approximately 2 mm, for example. The type of the washing liquid that can be housed in first washing liquid introduction part 530 may be appropriately selected in accordance with the application of fluid handling device 500. The washing liquid is water, for example.

First washing liquid introduction channel 531 is a channel in which fluid can move. The upstream end of first washing liquid introduction channel 531 is connected to first washing liquid introduction part 530. The downstream end of first washing liquid introduction channel 531 is connected to second diaphragm valve 532. In the present embodiment, first washing liquid introduction channel 531 is composed of a groove formed in substrate 510 and a film closing the opening of the groove. The cross-sectional area and cross-sectional shape of first washing liquid introduction channel 531 are not limited. First washing liquid introduction channel 531 has a substantially rectangular cross-sectional shape with a length (width and depth) of several tens of micrometers per side, for example. The cross-sectional area of first washing liquid introduction channel 531 may be or may not be constant in the flow direction of the fluid. In the present embodiment, the cross-sectional area of first washing liquid introduction channel 531 is constant.

Second diaphragm valve 532 is disposed between first washing liquid introduction channel 531 and first channel 540, and includes a partition wall and a diaphragm.

The partition wall of second diaphragm valve 532 is a wall disposed between first washing liquid introduction channel 531 and first channel 540. The partition wall functions as a valve seat of a diaphragm valve for opening and closing between first washing liquid introduction channel 531 and first channel 540. The shape and height of the partition wall are not limited as long as the above-mentioned function can be ensured. The partition wall has a rectangular prism shape, for example. The height of the partition wall is equal to the depth of first washing liquid introduction channel 531 and first channel 540, for example.

The diaphragm of second diaphragm valve 532 is a part of a film having flexibility, and has a substantially spherical cap shape. The film is disposed on substrate 510 such that the diaphragm is opposite to the partition wall without making contact with the partition wall. The diaphragm deflects toward the partition wall when pressed by protrusion 601 of rotary member 600 (described later). That is, the diaphragm functions as a valve element of a diaphragm valve. When protrusion 601 is not pressing the diaphragm, first washing liquid introduction channel 531 and first channel 540 are communicated with each other through the gap between the diaphragm and the partition wall. On the other hand, when protrusion 601 is pressing the diaphragm such that the diaphragm makes contact with the partition wall, first washing liquid introduction channel 531 and first channel 540 are not communicated with each other.

First channel 540 is a channel in which fluid can move. First channel 540 is connected to first liquid introduction part 520 (first liquid introduction channel 521) through first diaphragm valve 522, and is connected to first washing liquid introduction part 530 (first washing liquid introduction channel 531) through second diaphragm valve 532. Accordingly, liquid (first liquid) introduced to first liquid introduction part 520 and liquid (washing liquid) introduced to first washing liquid introduction part 530 flow through first channel 540. Note that second diaphragm valve 532 is disposed upstream of first channel 540 relative to first diaphragm valve 522. The downstream end of first channel 540 is connected to chamber 580. In the present embodiment, first channel 540 is composed of a groove formed in substrate 510 and a film closing the opening of the groove. The cross-sectional area and cross-sectional shape of first channel 540 are not limited. First channel 540 has a substantially rectangular cross-sectional shape with a length (width and depth) of several tens of micrometers per side, for example. The cross-sectional area of first channel 540 may be or may not be constant in the flow direction of the fluid. In the present embodiment, the cross-sectional area of first channel 540 is constant.

Second liquid introduction part 550 is a bottomed recess for introducing second liquid. In the present embodiment, second liquid introduction part 550 is composed of a through hole formed in substrate 510 and a film closing one opening of the through hole. The shape and size of second liquid introduction part 550 are not limited, and may be appropriately set as necessary. Second liquid introduction part 550 has a substantially columnar shape, for example. Second liquid introduction part 550 has a width of approximately 2 mm, for example. The fluid that can be housed in second liquid introduction part 550 may be appropriately selected in accordance with the application of fluid handling device 500. The fluid is fluid such as a reagent, a liquid sample, and powder. Normally, the first liquid introduced to first liquid introduction part 520 and the second liquid introduced to second liquid introduction part 550 are liquid of different types.

Second liquid introduction channel 551 is a channel in which fluid can move. The upstream end of second liquid introduction channel 551 is connected to second liquid introduction part 550. The downstream end of second liquid introduction channel 551 is connected to third diaphragm valve 552. In the present embodiment, second liquid introduction channel 551 is composed of a groove formed in substrate 510 and a film closing the opening of the groove. The cross-sectional area and cross-sectional shape of second liquid introduction channel 551 are not limited. Second liquid introduction channel 551 has a substantially rectangular cross-sectional shape with a length (width and depth) of several tens of micrometers per side, for example. The cross-sectional area of second liquid introduction channel 551 may be or may not be constant in the flow direction of the fluid. In the present embodiment, the cross-sectional area of second liquid introduction channel 551 is constant.

Third diaphragm valve 552 is disposed between second liquid introduction channel 551 and second channel 570, and includes a partition wall and a diaphragm.

The partition wall of third diaphragm valve 552 is a wall disposed between second liquid introduction channel 551 and second channel 570. The partition wall functions as a valve seat of a diaphragm valve for opening and closing between second liquid introduction channel 551 and second channel 570. The shape and height of the partition wall are not limited as long as the above-mentioned function can be ensured. The partition wall has a rectangular prism shape, for example. The height of the partition wall is equal to the depth of second liquid introduction channel 551 and second channel 570, for example.

The diaphragm of third diaphragm valve 552 is a part of a film having flexibility, and has a substantially spherical cap shape. The film is disposed on substrate 510 such that the diaphragm is opposite to the partition wall without making contact with the partition wall. The diaphragm deflects toward the partition wall when pressed by protrusion 601 of rotary member 600 (described later). That is, the diaphragm functions as a valve element of a diaphragm valve. When protrusion 601 is not pressing the diaphragm, second liquid introduction channel 551 and second channel 570 are communicated with each other through the gap between the diaphragm and the partition wall. On the other hand, when protrusion 601 is pressing the diaphragm such that the diaphragm makes contact with the partition wall, second liquid introduction channel 551 and second channel 570 are not communicated with each other.

Second washing liquid introduction part 560 is a bottomed recess for introducing washing liquid for washing second channel 570. In the present embodiment, second washing liquid introduction part 560 is composed of a through hole formed in substrate 510 and a film closing one opening of the through hole. The shape and size of second washing liquid introduction part 560 are not limited, and may be appropriately set as necessary. Second washing liquid introduction part 560 has a substantially columnar shape, for example. Second washing liquid introduction part 560 has a width of approximately 2 mm, for example. The type of the washing liquid that can be housed in second washing liquid introduction part 560 may be appropriately selected in accordance with the application of fluid handling device 500. The washing liquid is water, for example. The washing liquid introduced to first washing liquid introduction part 530 and the washing liquid introduced to second washing liquid introduction part 560 may be liquid of the same type, or different types.

Second washing liquid introduction channel 561 is a channel in which fluid can move. The upstream end of second washing liquid introduction channel 561 is connected to second washing liquid introduction part 560. The downstream end of second washing liquid introduction channel 561 is connected to fourth diaphragm valve 562. In the present embodiment, second washing liquid introduction channel 561 is composed of a groove formed in substrate 510 and a film closing the opening of the groove. The cross-sectional area and cross-sectional shape of second washing liquid introduction channel 561 are not limited. Second washing liquid introduction channel 561 has a substantially rectangular cross-sectional shape with a length (width and depth) of several tens of micrometers per side, for example. The cross-sectional area of second washing liquid introduction channel 561 may be or may not be constant in the flow direction of the fluid. In the present embodiment, the cross-sectional area of second washing liquid introduction channel 561 is constant.

Fourth diaphragm valve 562 is disposed between second washing liquid introduction channel 561 and second channel 570, and includes a partition wall and a diaphragm.

The partition wall of fourth diaphragm valve 562 is a wall disposed between second washing liquid introduction channel 561 and second channel 570. The partition wall functions as a valve seat of a diaphragm valve for opening and closing between second washing liquid introduction channel 561 and second channel 570. The shape and height of the partition wall are not limited as long as the above-mentioned function can be ensured. The partition wall has a rectangular prism shape, for example. The height of the partition wall is equal to the depth of second washing liquid introduction channel 561 and second channel 570, for example.

The diaphragm of fourth diaphragm valve 562 is a part of a film having flexibility, and has a substantially spherical cap shape. The film is disposed on substrate 510 such that the diaphragm is opposite to the partition wall without making contact with the partition wall. The diaphragm deflects toward the partition wall when pressed by protrusion 601 of rotary member 600 (described later). That is, the diaphragm functions as a valve element of a diaphragm valve. When protrusion 601 is not pressing the diaphragm, second washing liquid introduction channel 561 and second channel 570 are communicated with each other through the gap between the diaphragm and the partition wall. On the other hand, when protrusion 601 is pressing the diaphragm such that the diaphragm makes contact with the partition wall, second washing liquid introduction channel 561 and second channel 570 are not communicated with each other.

Second channel 570 is a channel in which fluid can move. Second channel 570 is connected to second liquid introduction part 550 (second liquid introduction channel 551) through third diaphragm valve 552, and is connected to second washing liquid introduction part 560 (second washing liquid introduction channel 561) through fourth diaphragm valve 562. Accordingly, liquid (second liquid) introduced to second liquid introduction part 550 and liquid (washing liquid) introduced to second washing liquid introduction part 560 flow through second channel 570. Note that fourth diaphragm valve 562 is disposed upstream of second channel 570 relative to third diaphragm valve 552. The downstream end of second channel 570 is connected to chamber 580. In the present embodiment, second channel 570 is composed of a groove formed in substrate 510 and a film closing the opening of the groove. The cross-sectional area and cross-sectional shape of second channel 570 are not limited. Second channel 570 has a substantially rectangular cross-sectional shape with a length (width and depth) of several tens of micrometers per side, for example. The cross-sectional area of second channel 570 may be or may not be constant in the flow direction of the fluid. In the present embodiment, the cross-sectional area of second channel 570 is constant.

Chamber 580 is a space for housing fluid in the inside. In the present embodiment, chamber 580 is composed of a recess formed in substrate 510 and a film closing the opening of the recess. The shape and size of chamber 580 are not limited, and may be appropriately adjusted in accordance with the application. Chamber 580 has a substantially cuboid shape, for example. Chamber 580 is separately connected to each of the downstream end of first channel 540 and the downstream end of second channel 570. In addition, chamber 580 is connected to the upstream end of discharge channel 581.

Discharge channel 581 is a channel in which fluid can move. The upstream end of discharge channel 581 is connected to chamber 580, and the downstream end of discharge channel 581 is connected to discharge part 582. Accordingly, the fluid (such as air and a mixture of the first liquid and the second liquid) in chamber 580 flows into discharge channel 581. In the present embodiment, discharge channel 581 is composed of a groove formed in substrate 510 and a film closing the opening of the groove. The cross-sectional area and cross-sectional shape of discharge channel 581 are not limited. Discharge channel 581 has a substantially rectangular cross-sectional shape with a length (width and depth) of several tens of micrometers per side, for example. The cross-sectional area of discharge channel 581 may be or may not be constant in the flow direction of the fluid. In the present embodiment, the cross-sectional area of discharge channel 581 is constant.

Discharge part 582 is a bottomed recess that is connected to chamber 580 through discharge channel 581. Discharge part 582 functions as an air hole, and as an outlet for ejecting liquid in chamber 580. In the present embodiment, discharge part 582 is composed of a through hole formed in substrate 510 and a film closing one opening of the through hole. The shape and size of discharge part 582 are not limited, and may be appropriately set as necessary. Discharge part 582 has a substantially columnar shape, for example. Discharge part 582 has a width of approximately 2 mm, for example.

Configuration of Rotary Member

Figure 11:
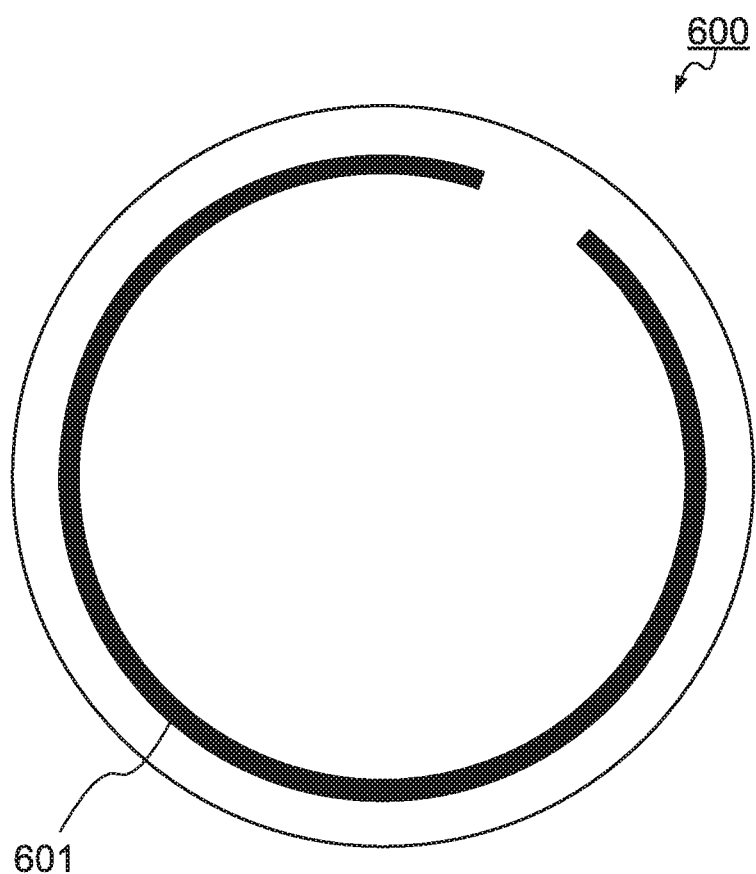
FIG. 11 is a plan view of a rotary member according to Embodiment 3.

FIG. 11 is a plan view of rotary member 600 according to Embodiment 3. In FIG. 11, for the sake of clarity, the top surface of protrusion 601 is colored black.

Rotary member 600 is a columnar member, and is rotatable around a rotation axis. Rotary member 600 is rotated by an external driving mechanism not illustrated.

Protrusion 601 for pushing first diaphragm valve 522, second diaphragm valve 532, third diaphragm valve 552 and fourth diaphragm valve 562 diaphragm is provided at the upper part of rotary member 600. Protrusion 601 has an arc-like shape in plan view.

Operation of Fluid Handling Device

Next, an operation of fluid handling device 500 is described with reference to FIGS. 12A to 12D. In FIGS. 12A to 12D, some components such as the diaphragm are omitted for the sake of clarity. In addition, the portion where the first liquid or the second liquid is present is colored black. Note that it is assumed that the first liquid is housed in first liquid introduction part 520, the second liquid is housed in second liquid introduction part 550, the washing liquid is housed in first washing liquid introduction part 530 and second washing liquid introduction part 560, and a pressure is being exerted on first liquid introduction part 520, second liquid introduction part 550, first washing liquid introduction part 530 and second washing liquid introduction part 560.

Figure 12A:
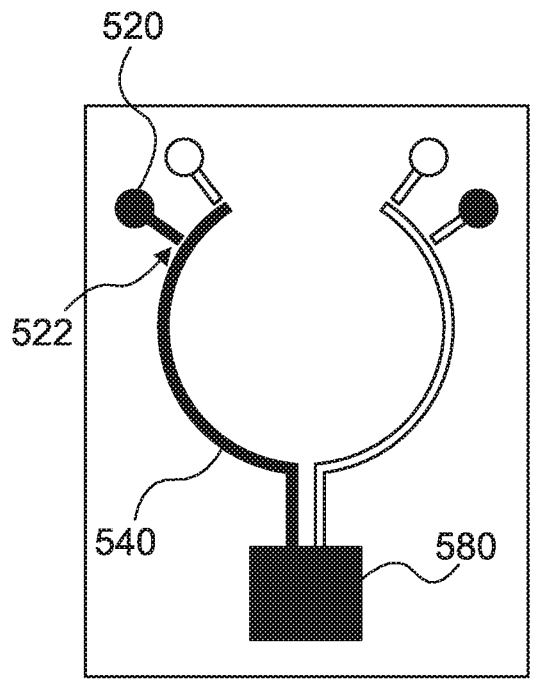
FIGS. 12A to 12D are schematic views for describing an operation of the fluid handling device according to Embodiment 3.

First, rotary member 600 is rotated to open first diaphragm valve 522 and close the other diaphragm valves. In this manner, as illustrated in FIG. 12A, the first liquid in first liquid introduction part 520 moves to chamber 580 through first liquid introduction channel 521, first diaphragm valve 522 and first channel 540. At this time, the first liquid does not flow into second channel 570 since first channel 540 and second channel 570 are separately connected to chamber 580.

Figure 12B:
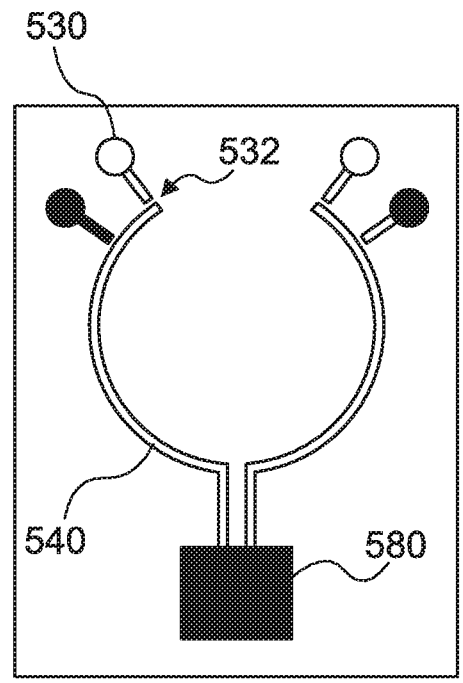

Next, rotary member 600 is rotated to open second diaphragm valve 532 and close the other diaphragm valves. In this manner, as illustrated in FIG. 12B, the washing liquid in first washing liquid introduction part 530 washes the inside of first washing liquid introduction channel 531, second diaphragm valve 532 and first channel 540.

Figure 12C:
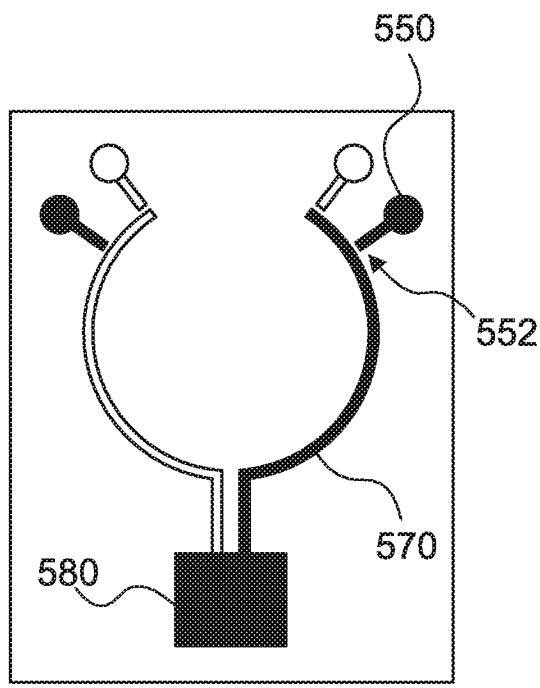

Next, rotary member 600 is rotated to open third diaphragm valve 552 and close the other diaphragm valves. In this manner, as illustrated in FIG. 12C, the second liquid in second liquid introduction part 550 moves to chamber 580 through second liquid introduction channel 551, third diaphragm valve 552 and second channel 570. At this time, the second liquid does not flow into first channel 540 since first channel 540 and second channel 570 are separately connected to chamber 580.

Figure 12D:
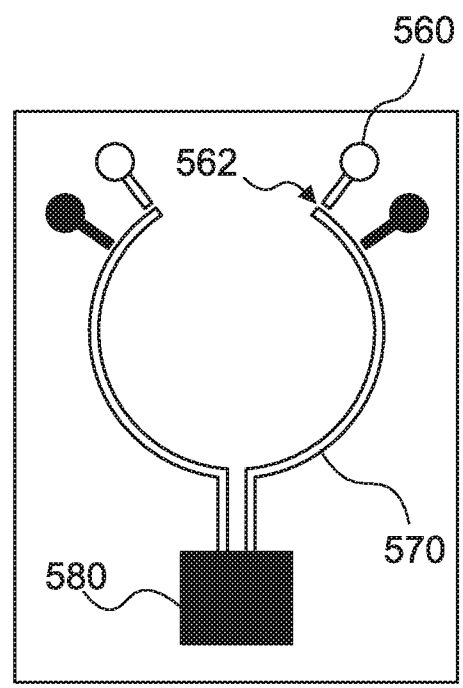

Finally, rotary member 600 is rotated to open fourth diaphragm valve 562 and close the other diaphragm valves. In this manner, as illustrated in FIG. 12D, the washing liquid in second washing liquid introduction part 560 washes the inside of second washing liquid introduction channel 561, fourth diaphragm valve 562 and second channel 570.

Through the above-mentioned procedure, it is possible to bring the first liquid and the second liquid into contact with each other for the first time in chamber 581 without bringing the first liquid and the second liquid into contact with each other in first channel 540 and second channel 570.

Effect

As described above, fluid handling device 500 according to Embodiment 3 can bring the first liquid and the second liquid into contact with each other for the first time in chamber 581 without bringing the first liquid and the second liquid into contact with each other in first channel 540 and second channel 570.

While fluid handling device 500 includes first diaphragm valve 522, second diaphragm valve 532, third diaphragm valve 552 and fourth diaphragm valve 562 in the present embodiment, fluid handling device 500 may not include first diaphragm valve 522, second diaphragm valve 532, third diaphragm valve 552 and fourth diaphragm valve 562.

While fluid handling device 500 includes the four liquid introduction parts in the present embodiment, fluid handling device 500 may further include another liquid introduction part.

This application is entitled to and claims the benefit of Japanese Patent Application No. 2018-029833 filed on Feb. 22, 2018, the disclosure each of which including the specification, drawings and abstract is incorporated herein by reference in its entirety.

INDUSTRIAL APPLICABILITY

The fluid handling device of the embodiment of the present invention is useful for various applications such as laboratory tests, food tests, and environment tests, for example.

REFERENCE SIGNS LIST

10 First liquid introduction part
12 First channel
20 Second liquid introduction part
22 Second channel
30 Liquid outlet part
32 Third channel
100 Fluid handling device
110 Substrate
120 Film
130 First liquid introduction part
131 First liquid introduction channel
132 Third diaphragm valve
140 First washing liquid introduction part
141 First washing liquid introduction channel
142 Fourth diaphragm valve
150 First channel
151 First diaphragm valve
160 Second liquid introduction part
161 Second liquid introduction channel
162 Fifth diaphragm valve
170 Second washing liquid introduction part
171 Second washing liquid introduction channel
172 Sixth diaphragm valve
180 Second channel
181 Second diaphragm valve
190 Third channel
191 Chamber
192 Discharge channel
193 Discharge part
200 Rotary member
210 First rotary member
211 First protrusion
220 Second rotary member
221 Second protrusion
230 Third rotary member 231 Third protrusion
300 Fluid handling device
310 Substrate
320 First liquid introduction part
321 First liquid introduction channel
322 Second diaphragm valve
330 First channel
340 Second liquid introduction part
341 Second liquid introduction channel
342 Third diaphragm valve
350 Second channel
360 Washing liquid introduction part
361 Washing liquid introduction channel
362 First diaphragm valve
370 Third channel
371 Chamber
372 Discharge channel
373 Discharge part
400 Rotary member
401 Protrusion
500 Fluid handling device
510 Substrate
520 First liquid introduction part
521 First liquid introduction channel
522 First diaphragm valve
530 First washing liquid introduction part
531 First washing liquid introduction channel
532 Second diaphragm valve
540 First channel
550 Second liquid introduction part
551 Second liquid introduction channel
552 Third diaphragm valve
560 Second washing liquid introduction part
561 Second washing liquid introduction channel
562 Fourth diaphragm valve
570 Second channel
580 Chamber
581 Discharge channel
582 Discharge part
600 Rotary member
601 Protrusion

What is claimed is:

1. A fluid handling device, comprising:
a first liquid introduction part configured to introduce first liquid;
a first washing liquid introduction part configured to introduce washing liquid;
a first channel configured to carry liquid introduced to the first liquid introduction part and liquid introduced to the first washing liquid introduction part;
a second liquid introduction part configured to introduce second liquid;
a second washing liquid introduction part configured to introduce washing liquid;
a second channel configured to carry liquid introduced to the second liquid introduction part and liquid introduced to the second washing liquid introduction part;
a third channel configured to carry liquid flowed through the first channel and liquid flowed through the second channel;
a first diaphragm valve disposed between the first channel and the third channel;
a second diaphragm valve disposed between the second channel and the third channel;
a chamber connected to the third channel;
a third diaphragm valve disposed between the first liquid introduction part and the first channel;
a fourth diaphragm valve disposed between the first washing liquid introduction part and the first channel;
a fifth diaphragm valve disposed between the second liquid introduction part and the second channel; and
a sixth diaphragm valve disposed between the second washing liquid introduction part and the second channel, wherein
the third diaphragm valve, the fourth diaphragm valve, the fifth diaphragm valve and the sixth diaphragm valve are disposed on a circumference of a first circle around a central axis,
the first diaphragm valve is disposed on a circumference of a second circle around the central axis,
the second diaphragm valve is disposed on a circumference of a third circle around the central axis.

2. The fluid handling device according to claim 1, wherein the first diaphragm valve and the second diaphragm valve are disposed at positions different from each other in a flow direction of the third channel.

* * * * *